(12) United States Patent
Matusek et al.

(10) Patent No.: US 10,976,189 B1
(45) Date of Patent: Apr. 13, 2021

(54) MEASURING AND DISPENSING DEVICE

(71) Applicants: Andrew Michael Matusek, Medina, OH (US); Jack Warren Gee, II, Willoughby, OH (US)

(72) Inventors: Andrew Michael Matusek, Medina, OH (US); Jack Warren Gee, II, Willoughby, OH (US)

( * ) Notice: Subject to any disclaimer, the term of this patent is extended or adjusted under 35 U.S.C. 154(b) by 0 days.

(21) Appl. No.: 16/709,242

(22) Filed: Dec. 10, 2019

Related U.S. Application Data

(60) Provisional application No. 62/783,400, filed on Dec. 21, 2018.

(51) Int. Cl.
*G01F 11/26* (2006.01)
*B65D 47/08* (2006.01)

(52) U.S. Cl.
CPC ........ *G01F 11/261* (2013.01); *B65D 47/0885* (2013.01)

(58) Field of Classification Search
CPC ... G01F 11/261; G01F 11/26; B65D 47/0885; B65D 47/088
USPC ......................................... 222/410, 414, 434
See application file for complete search history.

(56) References Cited

U.S. PATENT DOCUMENTS

| | | | | |
|---|---|---|---|---|
| 2,385,677 A | * | 9/1945 | Bailey | A47G 19/34 222/452 |
| 3,197,084 A | * | 7/1965 | Van Der Lely | A01C 15/007 222/254 |
| 4,386,719 A | * | 6/1983 | Serizawa | B65G 65/4836 222/190 |
| 4,893,737 A | * | 1/1990 | Borjesson | A47G 19/34 192/46 |
| 5,469,992 A | * | 11/1995 | Jenkins | A47G 19/34 222/185.1 |
| 5,495,962 A | * | 3/1996 | Nomura | A47G 19/34 222/240 |
| 5,622,467 A | * | 4/1997 | Pethullis | B65G 65/4836 222/410 |
| 6,550,640 B2 | * | 4/2003 | Smith | G01F 11/22 222/1 |
| 7,950,550 B2 | * | 5/2011 | Webster | B65D 47/04 222/370 |
| 8,925,768 B1 | | 1/2015 | Ismail | |

(Continued)

*Primary Examiner* — Donnell A Long
(74) *Attorney, Agent, or Firm* — Ralph E. Jocke; Walker & Jocke

(57) ABSTRACT

A measuring and dispensing device (10) is used to selectively dispense a selected fixed volume of a solid, flowable human consumable material. The device may be in releasable connection with a container (12) that is operable to deliver the material therefrom to the device by gravity. The device includes a lid (20) which is in rotatable connection with a cup plate (24). The cup plate includes a cup (26) having an interior volume. The cup has a cup outlet (80) that is closable by a relatively movable cup closure (28). The lid includes a lid plate opening (52) and the cup plate includes a cup plate opening (84) that are positionable in overlapping relation to enable the interior volume of the cup to be filled with material from the container. Relatively rotating the lid and cup plate to a cup fill prevented/release orientation that is angularly disposed from the cup fill enabled orientation, is operative to cause a latch (32) to automatically open the cup closure and enable the dispense of the material in the cup interior volume from the cup outlet.

34 Claims, 27 Drawing Sheets

(56) References Cited

U.S. PATENT DOCUMENTS

| | | | |
|---|---|---|---|
| 9,296,601 B2 | 3/2016 | Ismail | |
| D766,045 S | 9/2016 | Ismail | |
| 9,688,488 B2 * | 6/2017 | Yoshikawa | G01F 11/24 |
| 9,764,537 B2 * | 9/2017 | Chau | B29C 31/048 |
| 9,828,230 B2 | 11/2017 | Ismail | |
| 2010/0155433 A1 * | 6/2010 | Toyoda | B65G 65/4836 |
| | | | 222/410 |
| 2013/0168418 A1 * | 7/2013 | Druyan | A47G 19/2266 |
| | | | 222/454 |
| 2016/0159636 A1 * | 6/2016 | Ismail | B67D 3/0041 |
| | | | 222/1 |
| 2019/0023460 A1 * | 1/2019 | Veness | B65D 53/02 |
| 2019/0100362 A1 * | 4/2019 | Meyers | B65D 51/242 |

* cited by examiner

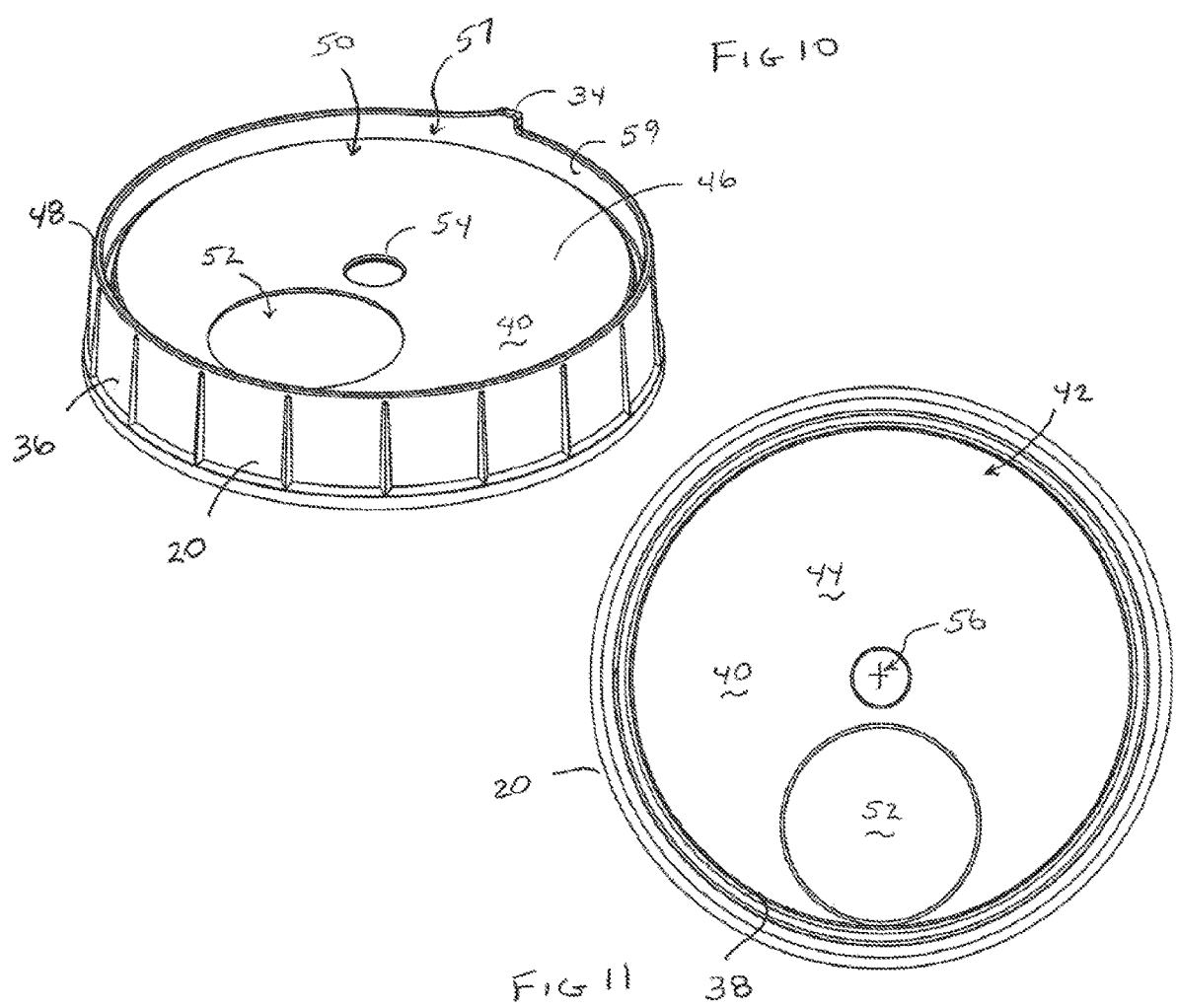

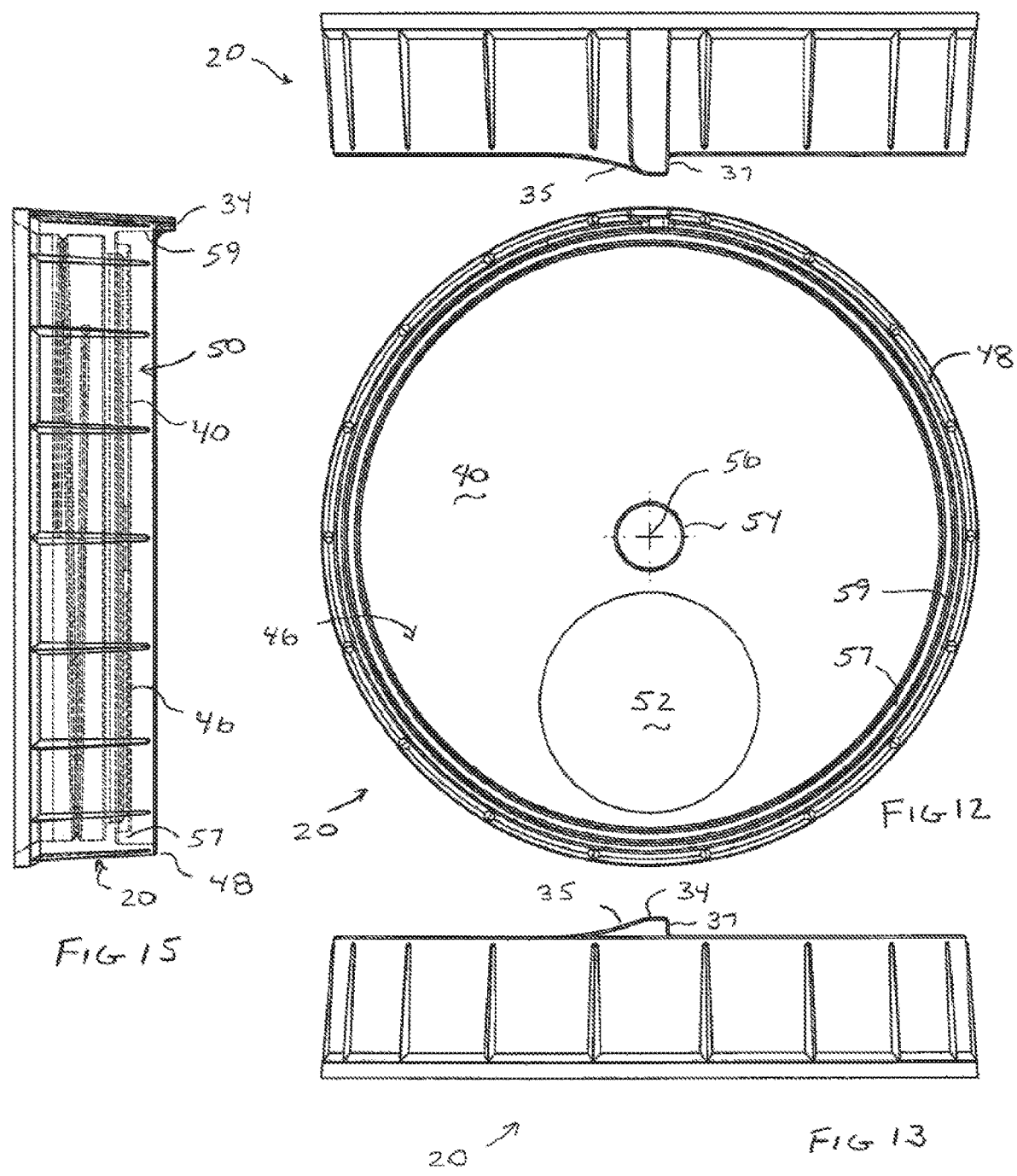

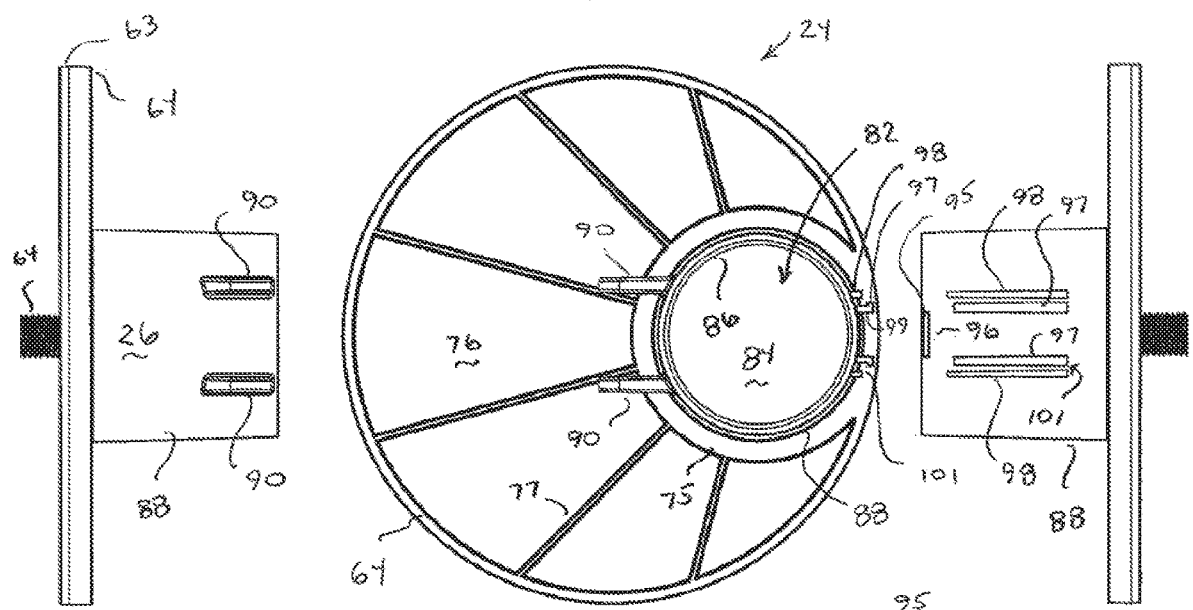
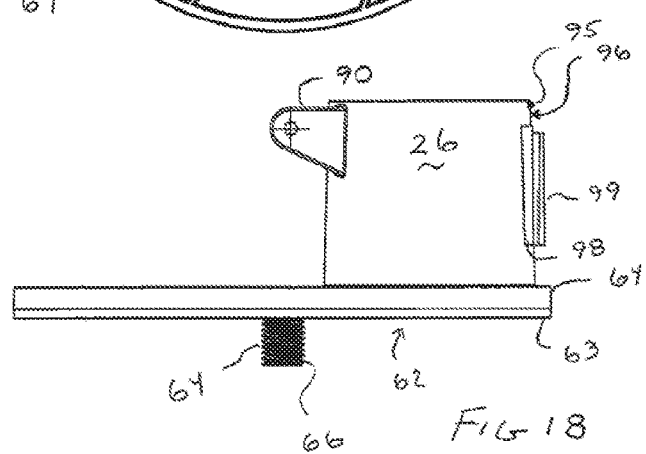

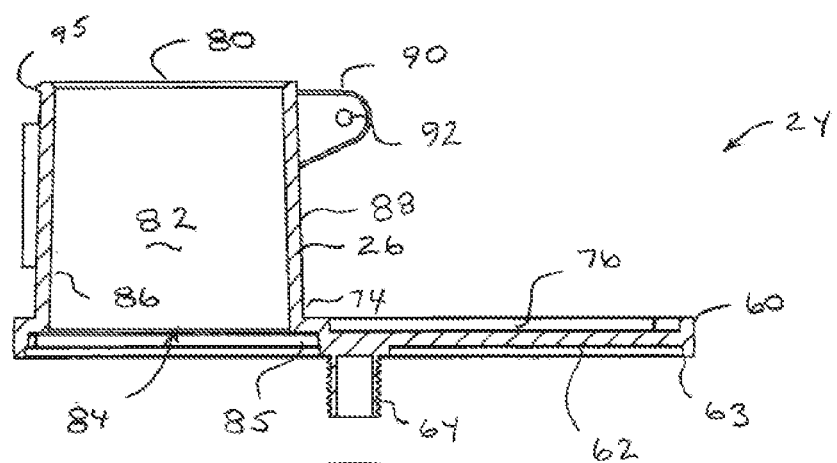
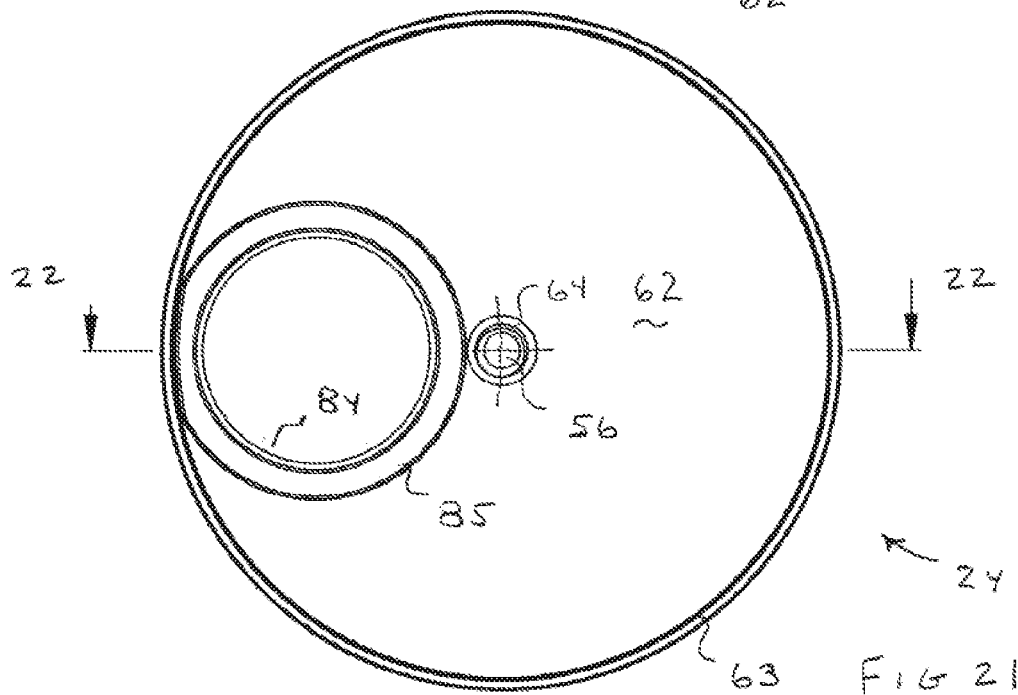

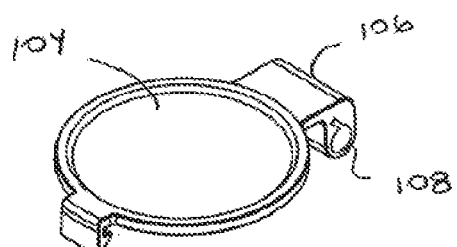
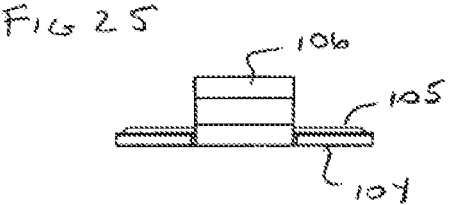
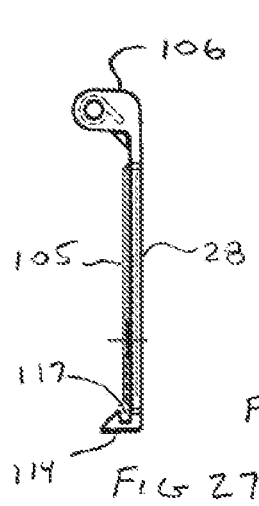
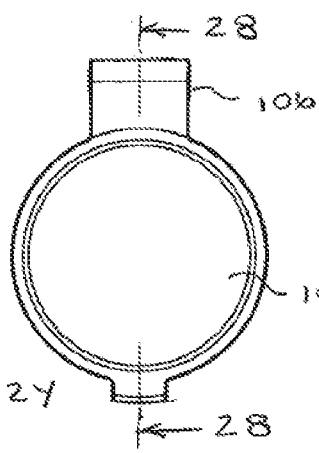
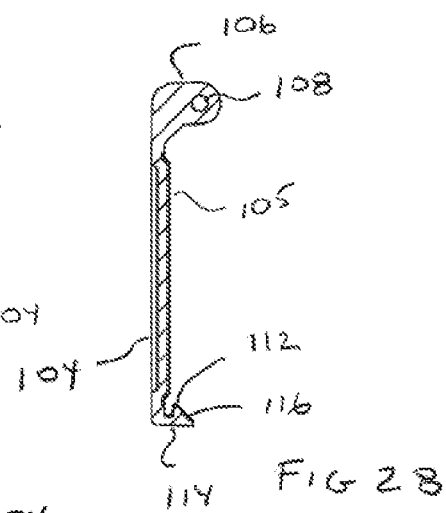
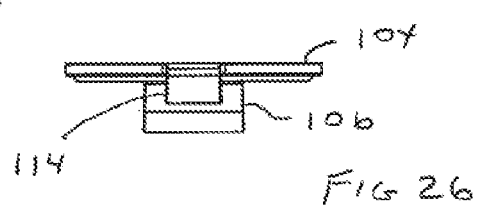

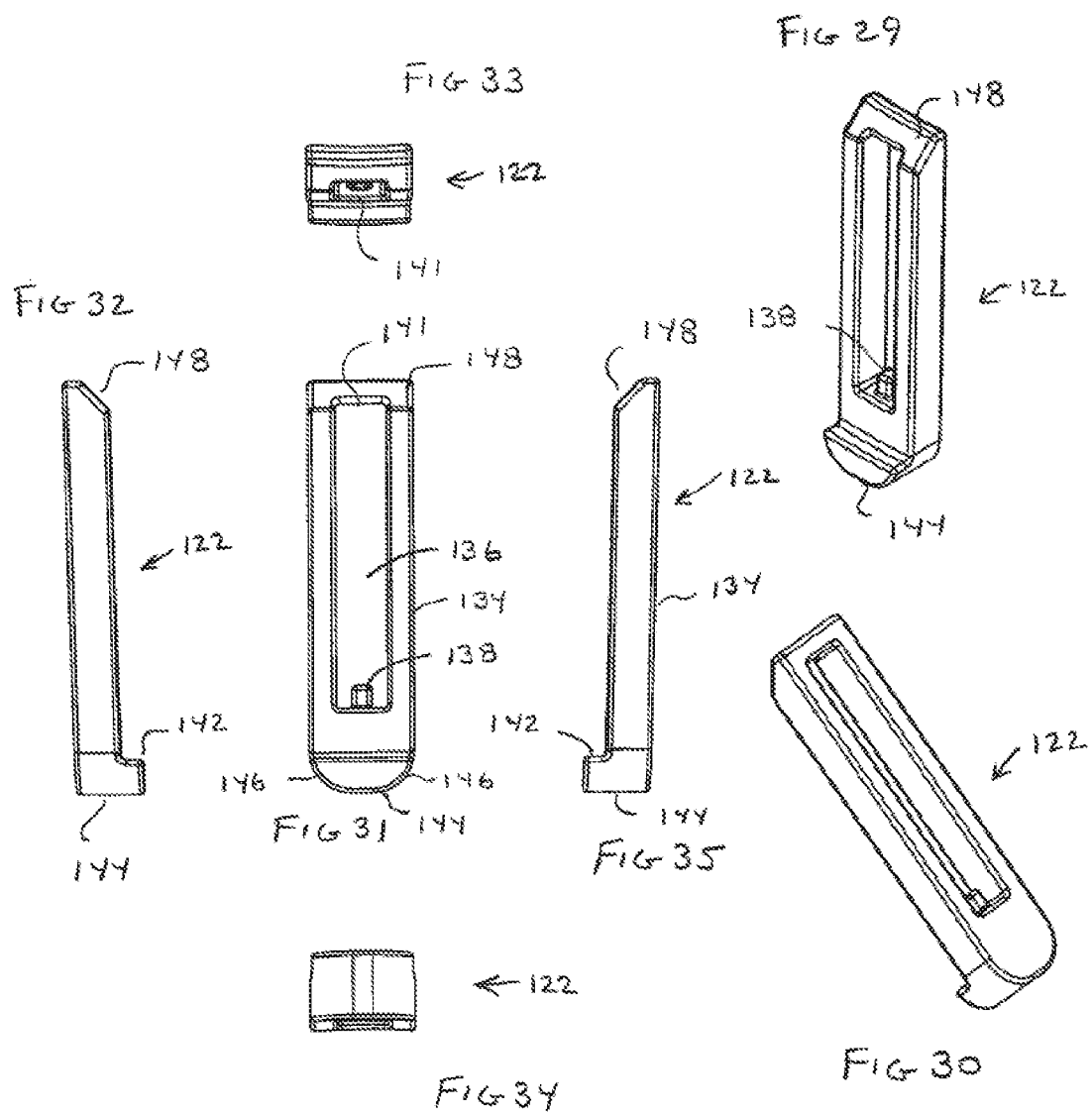

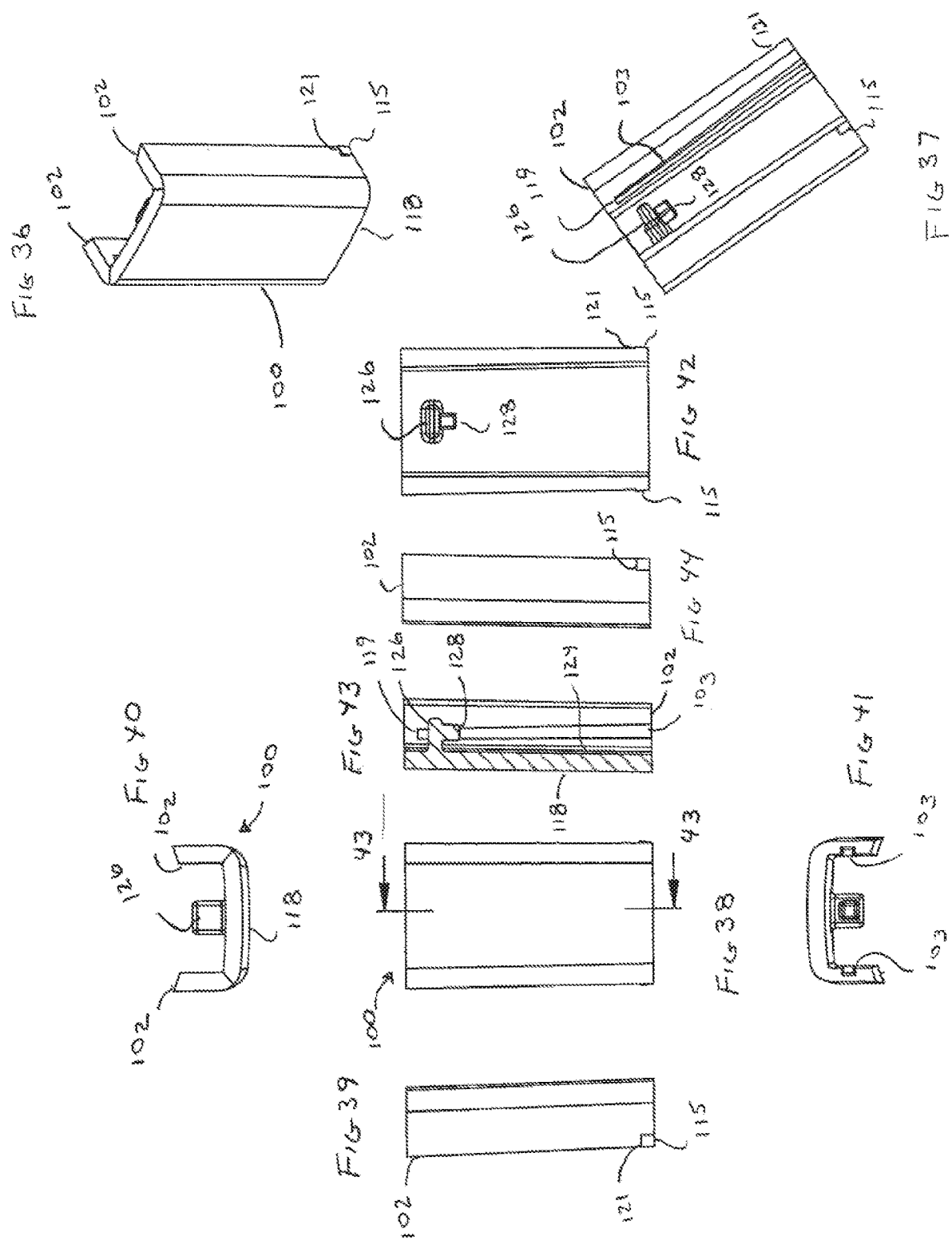

MEASURING AND DISPENSING DEVICE

TECHNICAL FIELD

Exemplary arrangements relate to measuring and dispensing devices. Exemplary arrangements specifically relate to measuring and dispensing devices that can be used to accurately measure a volume of a solid, flowable human consumable material from a container holding such material, and to selectively dispense a measured volume of such material.

BACKGROUND

Many different types of human consumable materials are provided in reclosable containers. Solid flowable materials such as powders, particulates or granules are often provided in relatively large containers. To remove the material from the container users are often required to tip the container so that the material can flow out of a container opening by gravity into a measuring cup or other similar device. The process of pouring or otherwise removing the flowable material from the container can result in some of the material being spilled. As a result a mess is created and some material is lost. Manually reaching into a container interior with a measuring scoop is messy and may introduce contaminants into the container. Further, the process of pouring or otherwise removing the material from the interior of the container may be difficult to do in a way that results in an accurate and repeatable amount of the material being removed. Obtaining an accurately measured volumetric amount of the material may be important when the material involved is a medication, dietary supplement or other material of which a fixed amount is repeatedly required delivered for consumption.

Measuring and dispensing devices may benefit from improvements.

SUMMARY OF DISCLOSURE

Exemplary arrangements include a measuring and dispensing device that is releasably engageable with a container that holds a solid flowable human consumable material. The device includes a lid for releasably closing an opening to the container.

A cup plate is rotatably movably attached to the lid. The cup plate includes a cup which bounds a cup interior that has a measured volume. The cup includes an inner cup side and outer cup side. The outer cup side includes a cup outlet. A cup closure is movably connected to the cup and is movable between a cup closed position in which the cup outlet is closed and a cup dispense position in which the cup outlet is open.

The lid includes a circular lid plate portion that includes a lid plate opening. The lid plate opening extends through the lid. The cup plate includes a cup plate opening. The cup plate opening extends through the cup plate to the cup interior. The lid plate opening and the cup plate opening are configured so that when the lid and the cup plate are in a cup fill enabled orientation the openings are in overlapping relation. In this orientation and with the cup closure in the cup closed position, the cup interior can be filled with material by tipping the container so that material flows by gravity into the cup interior. The material in the cup interior can be held in the cup interior by relatively rotatably moving the cup plate and the lid away from the cup fill enabled orientation.

The exemplary arrangement further includes a latch. The latch is in operative connection with the lid, the cup plate and the cup closure. The latch is operative to hold the cup closure in the cup closed position when the lid and cup plate are in the cup fill enabled orientation. When the lid and cup plate are relatively rotatably moved away from the cup fill enabled orientation to a cup fill prevented/release orientation that is angularly disposed away from the cup fill enabled orientation, the cup closure is enabled to open. This causes the measured volume of material in the cup interior to be dispensed by gravity through the cup opening.

Numerous additional features and relationships of exemplary arrangements are discussed in the Detailed Description that follows.

BRIEF DESCRIPTION OF DRAWINGS

FIG. 10 is a front top right perspective view of the lid of the exemplary measuring and dispensing device.

FIG. 11 is a bottom view of the lid.

FIG. 12 is a top view of the lid.

FIG. 13 is a front view of the lid.

FIG. 14 is a back view of the lid.

FIG. 15 is a left side view of the lid.

FIG. 17 is a top view of the cup plate.

FIG. 18 is a left side view of the cup plate.

FIG. 19 is a front view of the cup plate.

FIG. 20 is a back view of the cup plate.

FIG. 21 is a bottom view of the cup plate.

FIG. 22 is a sectional view along lines 22-22 in FIG. 21.

FIG. 23 is a front top right perspective view of the exemplary cup closure.

FIG. 24 is a top view of the cup closure.

FIG. 25 is a back view of the cup closure.

FIG. 26 is a front view of the cup closure.

FIG. 27 is a left side view of the cup closure.

FIG. 28 is a cross-sectional view along line 28-28 in FIG. 24.

FIG. 29 is a front top left perspective view of an exemplary pushrod.

FIG. 30 is a back left perspective view of the exemplary pushrod.

FIG. 31 is a front view of the pushrod.

FIG. 32 is a left side view of the pushrod.

FIG. 33 is a top view of the pushrod.

FIG. 34 is a bottom view of the pushrod.

FIG. 35 is a right side view of the pushrod.

FIG. 36 is a front top right perspective view of the guide sleeve of an exemplary arrangement.

FIG. 37 is a left back perspective view of the guide sleeve.

FIG. 38 is a front view of the guide sleeve.

FIG. 39 is a left side view of the guide sleeve.

FIG. 40 is a top view of the guide sleeve.

FIG. 41 is a bottom view of the guide sleeve.

FIG. 42 is a back view of the guide sleeve.

FIG. 43 is a cross-sectional view along line 43-43 in FIG. 38.

FIG. 44 is a right side view of the guide sleeve.

DETAILED DESCRIPTION

Figure 1:
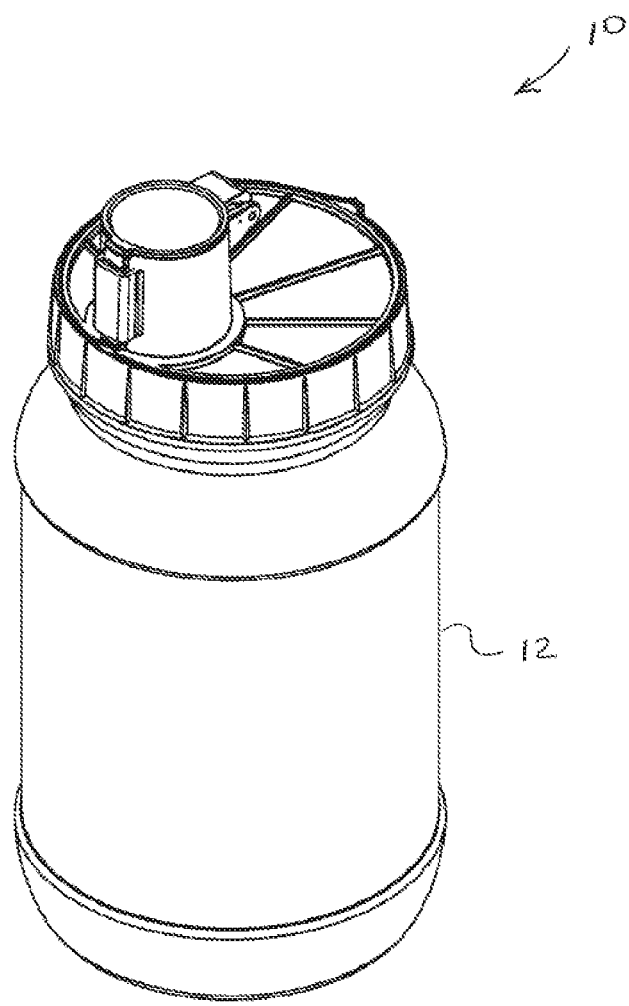
FIG. 1 is a front top right perspective view of an exemplary measuring and dispensing device in engagement with a container holding solid flowable material.

Referring now to the drawings and particularly to FIG. 1 there is shown therein a measuring and dispensing device of an exemplary arrangement generally indicated 10. Device 10 is shown in releasable connection with a container 12. The container 12 includes a container interior 14. In exemplary arrangements the container interior houses a solid, flowable human consumable material. Such materials may include for example, powder, particulate or granular materials that are pourable from the container interior by gravity. In some exemplary arrangements, the material may comprise a food material, a dietary supplement, a medication or other material that is desirable to remove from the container in consistent measured volumetric amounts.

Figure 2:
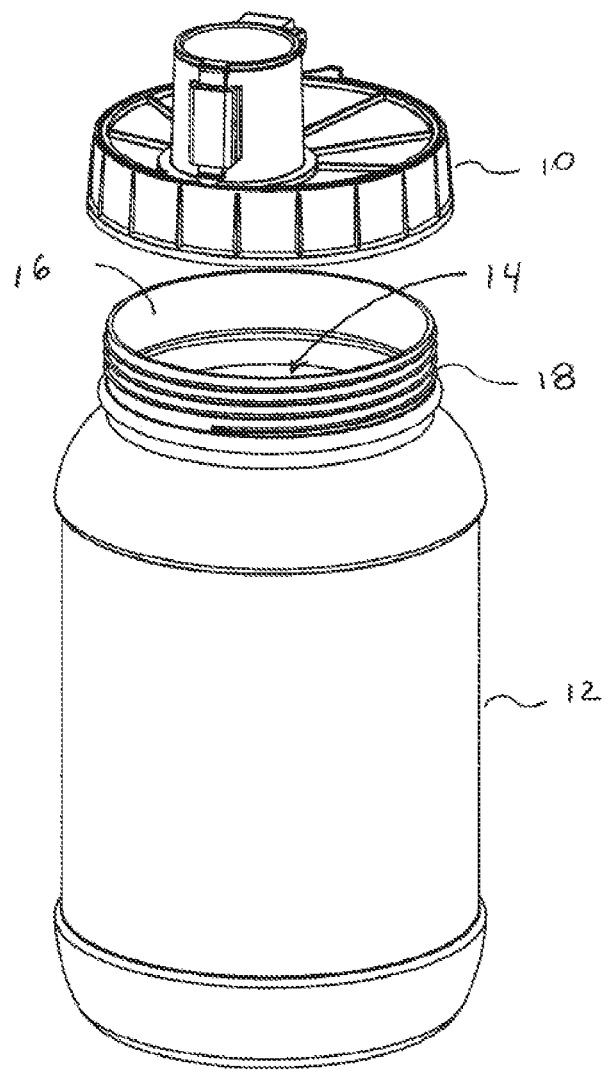
FIG. 2 is a front top right perspective view showing the measuring and dispensing device disengaged from the container.

As shown in FIG. 2 the exemplary container 12 includes a container opening 16. The annular portion of the container bounding the container opening 16 includes external threads 18. The external threads are configured to releasably matingly engage corresponding threads on a lid of the device 10. As can be appreciated, in exemplary arrangements the container 12 may be provided to a user filled with the material and may include a conventional container closure such as a threaded top. When it is desired to utilize the measuring and dispensing device 10 of the exemplary arrangement, the threaded top may be discarded or placed aside and the device 10 installed in engagement with the container. Of course it should be understood that these approaches are exemplary, and in other arrangements other structures for holding and delivering the material to the device may be used.

Figure 3:
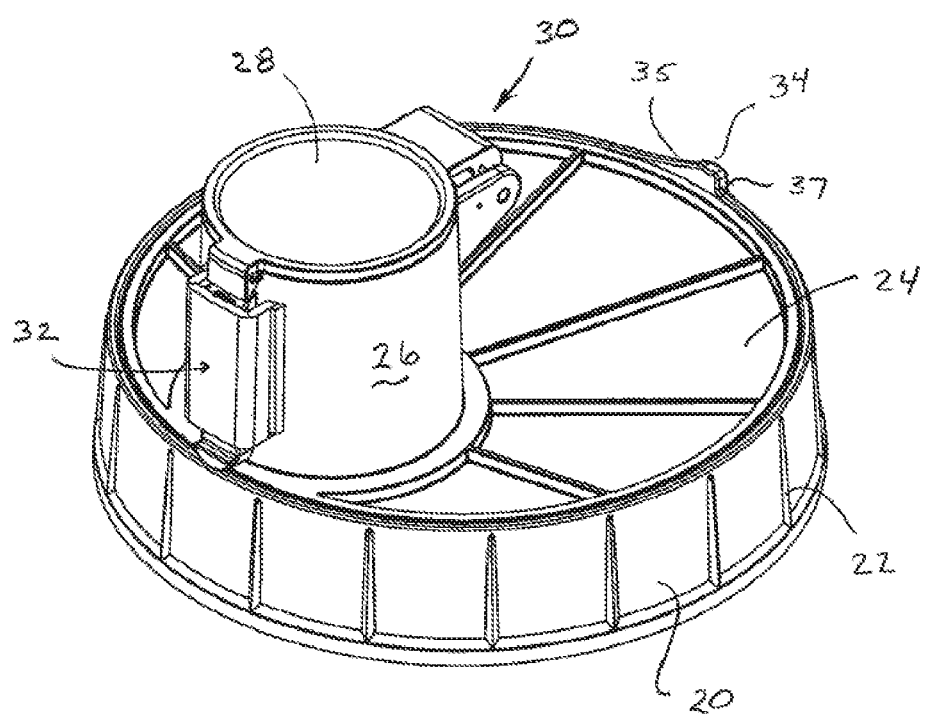
FIG. 3 is a front top right perspective view of the exemplary measuring and dispensing device.
Figure 4:
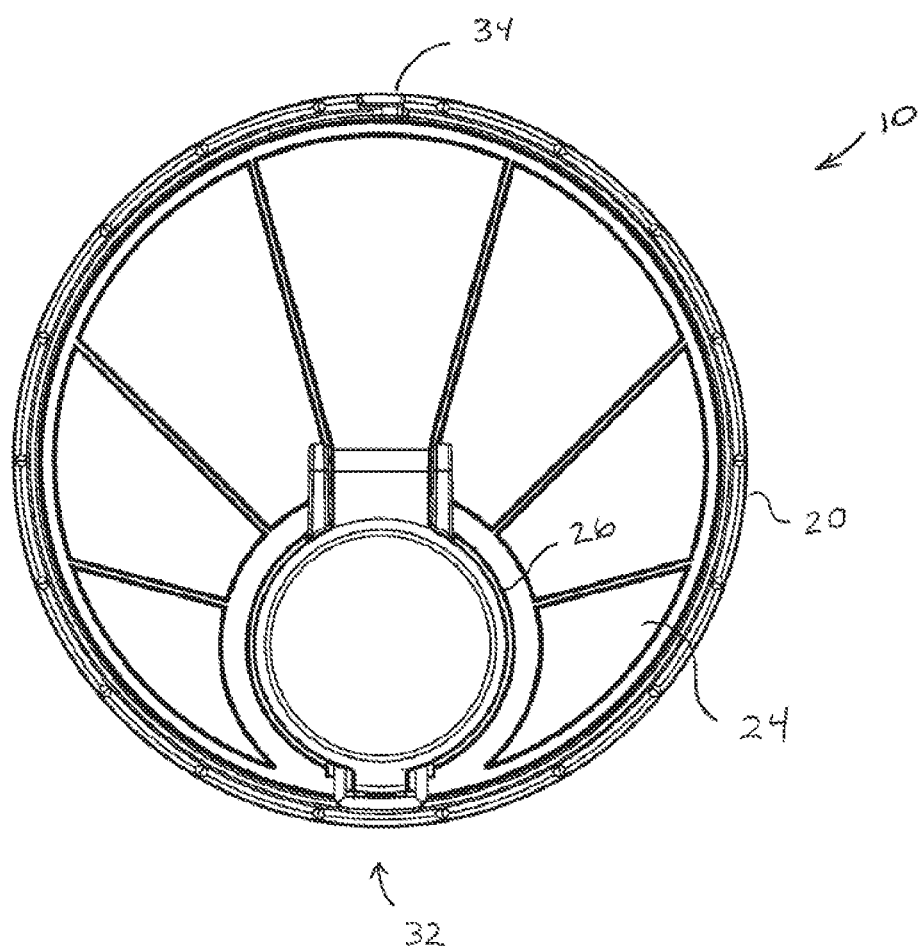
FIG. 4 is a top view of the measuring and dispensing device.
Figure 5:
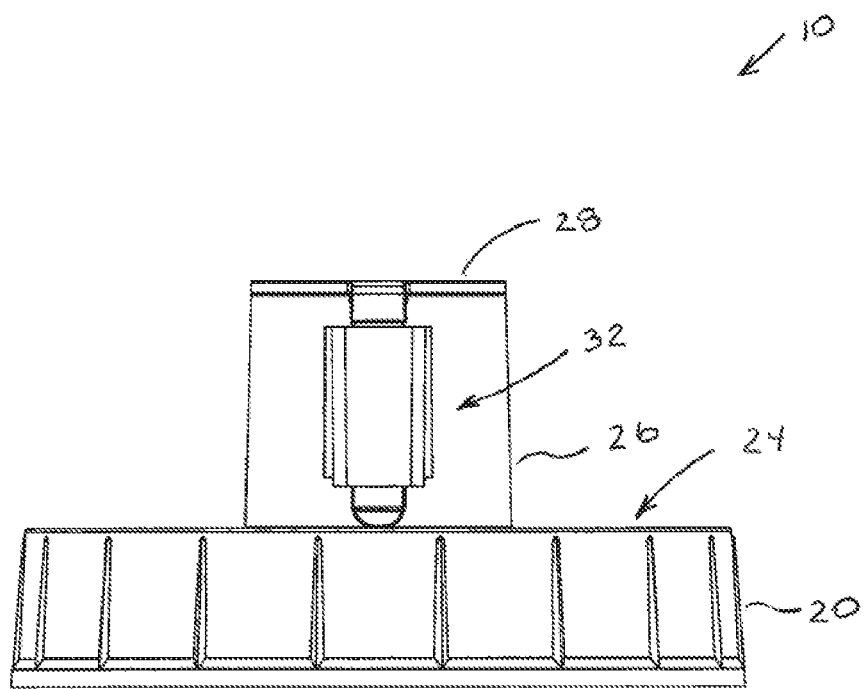
FIG. 5 is a front view of the measuring and dispensing device.
Figure 6:
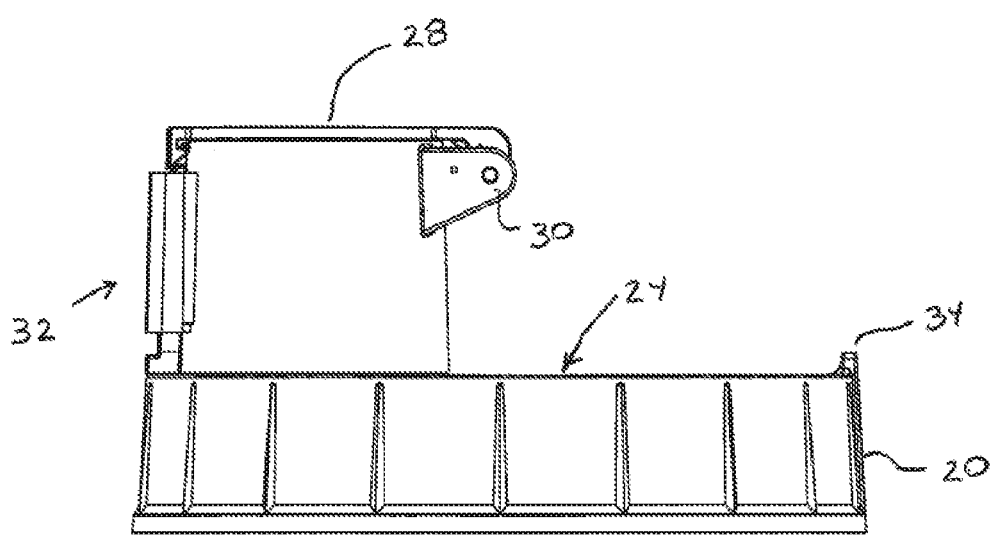
FIG. 6 is a right side view of the measuring and dispensing device.
Figure 7:
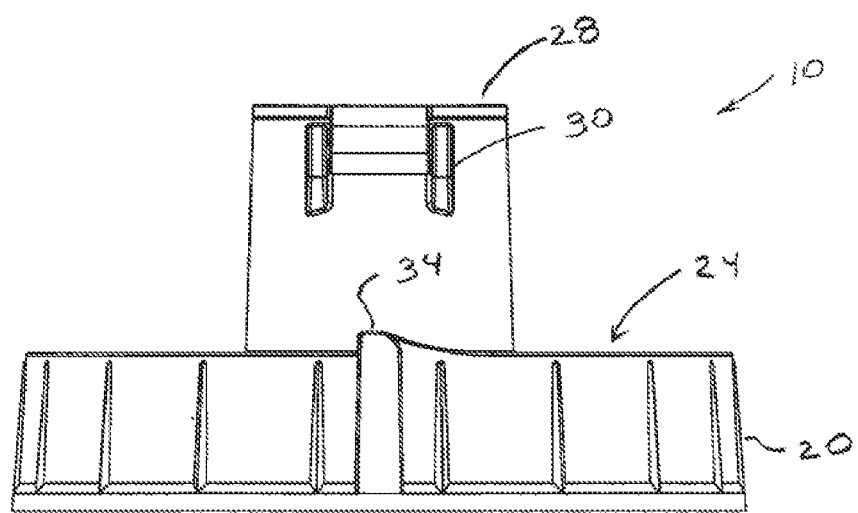
FIG. 7 is a back view of the measuring and dispensing device.

As shown in FIG. 3 the exemplary device 10 includes a lid 20. The exemplary lid 20 includes an annular outer surface that includes a plurality of angularly spaced radially outward extending projections 22. Projections 22 facilitate manually engaging the lid, particularly when installing and removing the lid 20 from engagement with the container 12.

The exemplary device 10 further includes a cup plate 24. The cup plate 24 which is later described in detail, includes a cup 26 in fixed connection therewith. A cup closure 28 is in movably attached connection with the cup through a hinge 30.

A latch generally indicated 32 is in operative connection with the cup closure 28, the cup plate 24 and the lid 20. The latch 32 of the exemplary arrangement is operative to hold the cup closure in the cup closed position in a cup fill orientation of the lid and cup plate, which enables an interior of the cup to be filled with material from the container. The latch further enables the cup closure 28 to change from a cup closed position to a cup dispense position when the lid and cup plate are in a cup fill prevented/release position and in which the measured volume of material housed in the interior of the cup is enabled to be dispensed therefrom by the cup closure 28 moving to a cup dispense position. In the exemplary arrangement a cam lobe 34 that is in operative connection with the lid 20, is operative to define the cup fill prevented/dispense position in which the cup closure 28 is enabled to be moved to the cup dispense position which enables the dispense of the material from the interior of the cup. Of course it should be understood that these components and the operation thereof in the exemplary arrangement, which is later described in detail, is exemplary and in other arrangements other features, components, configurations and arrangements may be utilized.

Figure 8:
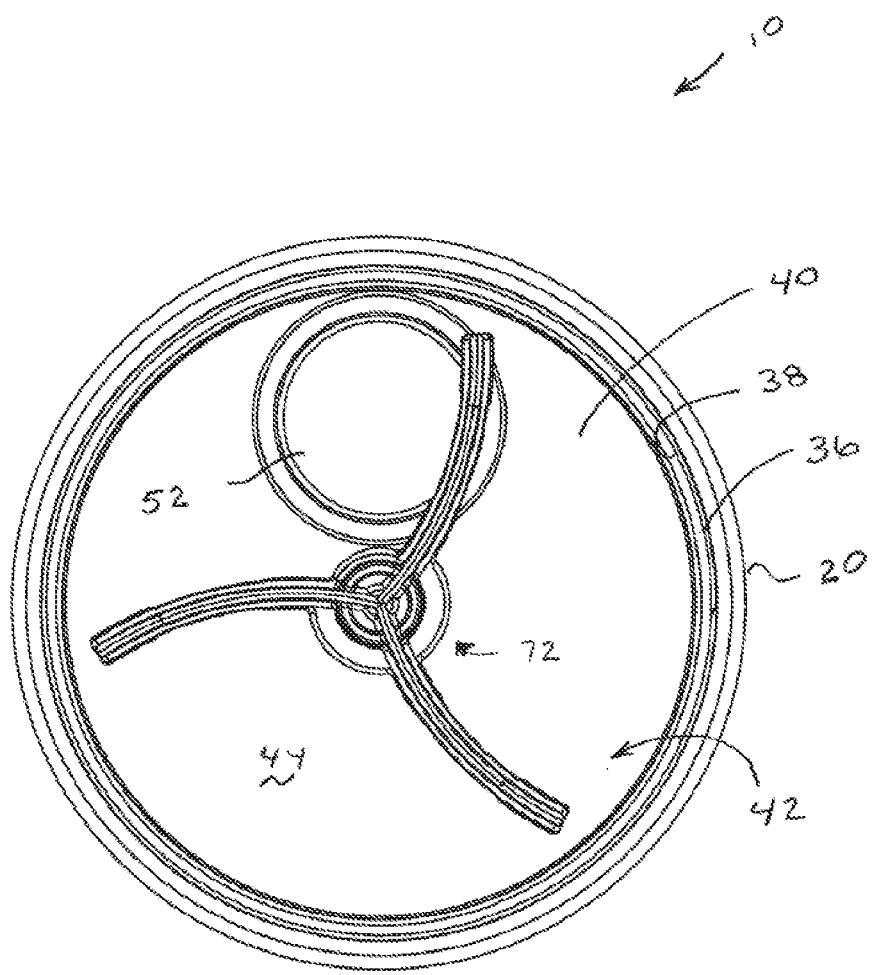
FIG. 8 is a bottom view of the measuring and dispensing device.

As shown in FIG. 8 the exemplary lid 20 includes an annular ring portion 36. Annular ring portion 36 includes internal threads 38. Internal threads 38 are configured to matingly engage with the external threads 18 of the container 12. A circular lid plate 40 is in operative connection with the ring portion 36. The ring portion 36 and lid plate 40 bound a circular lid inner recess 42. The lid plate 40 substantially closes the lid inner recess 42. As used herein substantially closes means that a majority of the area that would otherwise be open, is closed.

The lid plate 40 includes a substantially planar inner lid plate face 44. As used herein substantially planar means that most of the surface lies in a single plane. The lid plate 40 further includes a substantially planar outer lid plate face 46 (see FIG. 10). The exemplary ring portion 36 includes an annular rim 48. The annular rim 48 and the outer lid plate face 46 bound an outer lid recess 50. In the exemplary arrangement the cam lobe 34 extends outwardly from the rim 48 and perpendicular to the outer lid plate face. A lid opening 52 extends through the lid plate 40 and into the lid inner recess 42. Lid plate 40 further includes a lid opening 54. The lid opening 54 is centered at an axis 56. The axis 56 is also centered with respect to the rim 48 and the ring portion 36. The axis extends substantially perpendicular to the outer lid plate face 46. In the exemplary arrangement the lid plate opening 52 is disposed radially outward from the axis 56 as well as from the lid opening 54.

A continuous annular lid plate recess 57 extends in the outer lid plate face 46. Lid plate recess 57 is axially centered about axis 56 and is disposed radially outward of the lid plate opening 52. In the exemplary arrangement the lid plate recess 57 is bounded radially outward by an annular wall 59 that terminates outwardly on the lid 20 at rim 48. Of course it should be understood that this configuration is exemplary and in other arrangements other approaches may be used.

As shown in FIGS. 16-22 the exemplary cup plate 24 includes a circular periphery 58. In the exemplary arrangement the circular periphery includes an annular flange 60 thereon. The cup plate 24 further includes a circular substantially planar inner cup plate face 62. In the operative position, the cup plate 24 is positioned with the inner cup plate face 62 extending within the outer lid recess 50 and in movable operatively abutting relation with the outer lid plate face 46. The exemplary lid 24 further includes a continuous annular axially centered cup plate projection 63. Cup plate projection 63 extends from the inner cup plate face 62 toward the outer lid plate face 46. The cup plate projection 63 is configured to extend in the lid plate recess 57 and is movable therein when the cup plate and the lid are in the assembled condition. In the exemplary arrangement the cup plate projection is integral with the flange 60 and is sized to be movable in close-fitting relation in the lid plate recess. In the exemplary arrangement the configuration of the inner cup face 62 and the outer lid plate face 46 along with the interengaging cup plate projection 63 and lid plate recess 57 is operative to minimize the ability for material to infiltrate between the relatively movable surfaces of the lid and the cup plate. Further in the exemplary arrangement, the flange 60 extends substantially parallel to the axis and in movable abutting relation with the annular wall 59 adjacent rim 48 about the entire circumference thereof so as to minimize the risk of any material or other substances migrating radially between the flange 60 and the rim 48. Of course this configuration is exemplary and in other arrangements other approaches may be used.

A shaft 64 extends in axially centered relation from the inner plate face 62. The shaft 64 is sized to extend through the lid opening 54 and to be rotatable therein. The exemplary shaft 64 includes threads 66 thereon. In the exemplary arrangement the shaft 64 extends through the lid opening 54 and engages a threaded opening 68 in a hub 70 of a vane assembly 72 that is later described in detail. The opening 68 of the exemplary arrangement is configured to accept the shaft 64 and the threads 66 thereon in close-fitting engagement. This causes the vane assembly 72 to be rotatable in coordinated operatively engaged relation with the cup plate 24. Of course it should be understood that this arrangement for operatively engaging the vane assembly and the cup plate is exemplary, and in other arrangements other approaches may be used.

Cup plate 24 further includes the cup 26. The cup 26 is in fixed operative connection with the cup plate 24. The cup 26 extends outwardly from the cup plate parallel to the axis on a side opposed of the inner cup plate face 62. The exemplary cup 26 includes an inner cup side 74 that is immediately adjacent to an outer cup plate face 76 that extends on an opposed side of the cup plate from the inner cup plate face 62. The exemplary outer cup face 76 includes a boss 75 that extends in surrounding relation of the cup at the inner cup side 74 adjacent the outer cup plate face. A plurality of outward extending ribs 77 extend from the boss 75 to the flange 60. In the exemplary arrangement this configuration provides added strength to the cup plate.

The cup 26 further includes an outer cup side 78 which is positioned outwardly away from the outer cup plate face 76. The outer cup side 78 has a cup outlet 80 therein. The cup outlet 80 is open to a cup interior 82. The cup interior generally has a fixed volume between the inner cup plate face 62 and the cup outlet 80 that is configured to bound a measured volume of the material that is dispensed from the device each time that the device is operatively cycled to dispense material. The exemplary cup is generally cylindrical in shape, however other arrangements may have different cup shapes. As can be appreciated the volume of material that is selectively dispensed through operation of the device in each operating cycle may be varied by varying the internal volume of the cup interior 82. This may be done for a device through the use of cup inserts as later discussed. Of course this approach is exemplary and in other arrangements other approaches may be used.

The exemplary cup plate 24 further includes a cup plate opening 84. The cup plate opening 84 extends through the cup plate and through the inner cup plate face 62 and outer cup plate face 76. The cup plate opening 84 is open to the cup interior 82 of the cup 26. The cup plate opening is radially inwardly disposed from the cup plate projection 63. In the exemplary arrangement the cup plate opening 84 substantially corresponds in size and configuration to the lid plate opening 52. The cup plate opening 84 also substantially corresponds to the configuration of an inner wall 86 that bounds laterally the cup interior 82 between the inner cup side and the outer cup side. In the assembled condition the cup plate opening 84 of the exemplary arrangement also corresponds in its radial displacement from the axis 56, to the radial position of the lid plate opening 52. Thus in the exemplary arrangement, the lid plate opening 52 and the cup plate opening 84 may be positioned in overlapping relation and further in substantially exact alignment so as to enable material to flow through both openings to the cup interior 82 as later discussed. Of course it should be understood that this configuration is exemplary and other arrangements in which openings in the lid plate and the cup plate may be in flow communication without being fully substantially overlapping with one another may be utilized.

In the exemplary arrangement the cup plate opening 84 has an annular recess 85 in surrounding relation thereof. The annular recess 85 extends inwardly into the inner cup plate face 62. As later discussed in detail, the annular recess 85 is configured to accept therein a base flange of a cup insert that can be releasably engaged in the cup so as to change the measured volume of material that can be held in the interior area thereof.

Figure 9:
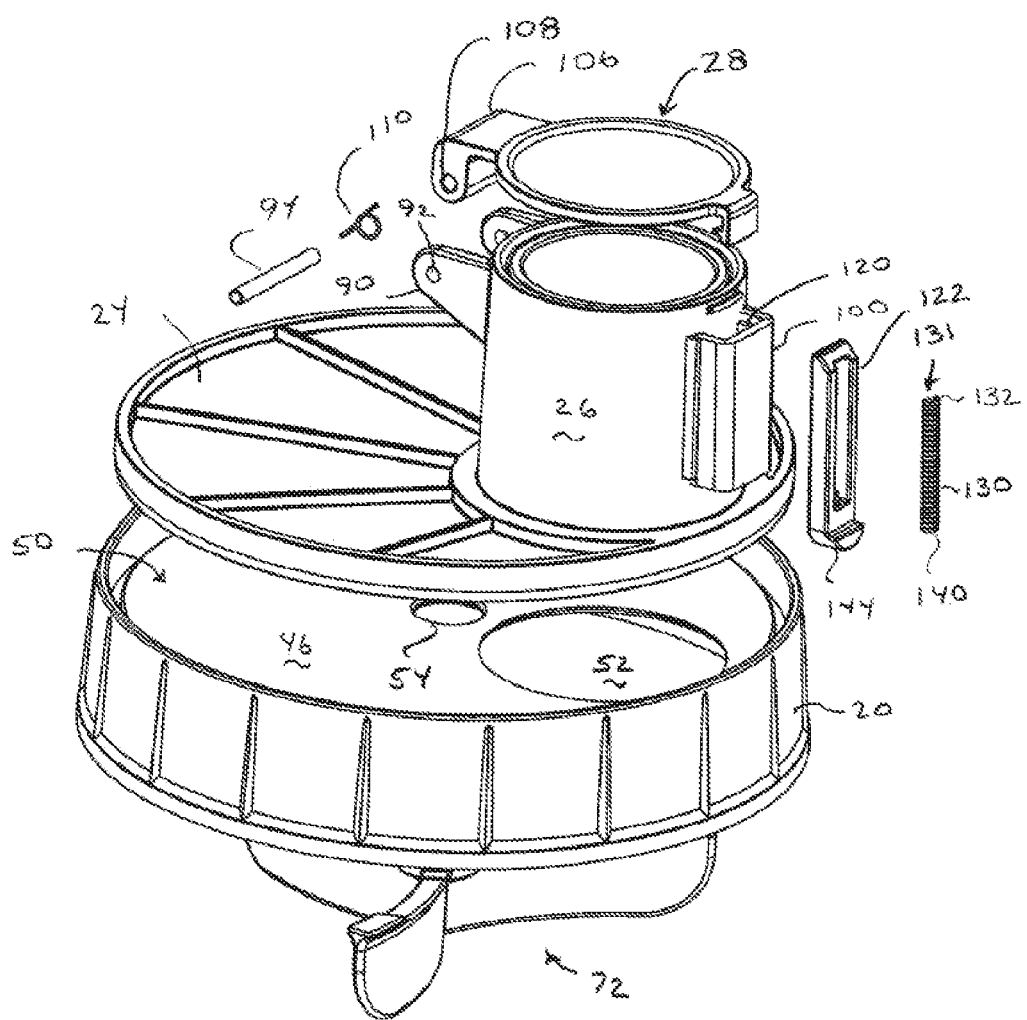
FIG. 9 is a front left top exploded view of the exemplary measuring and dispensing device.
Figure 16:
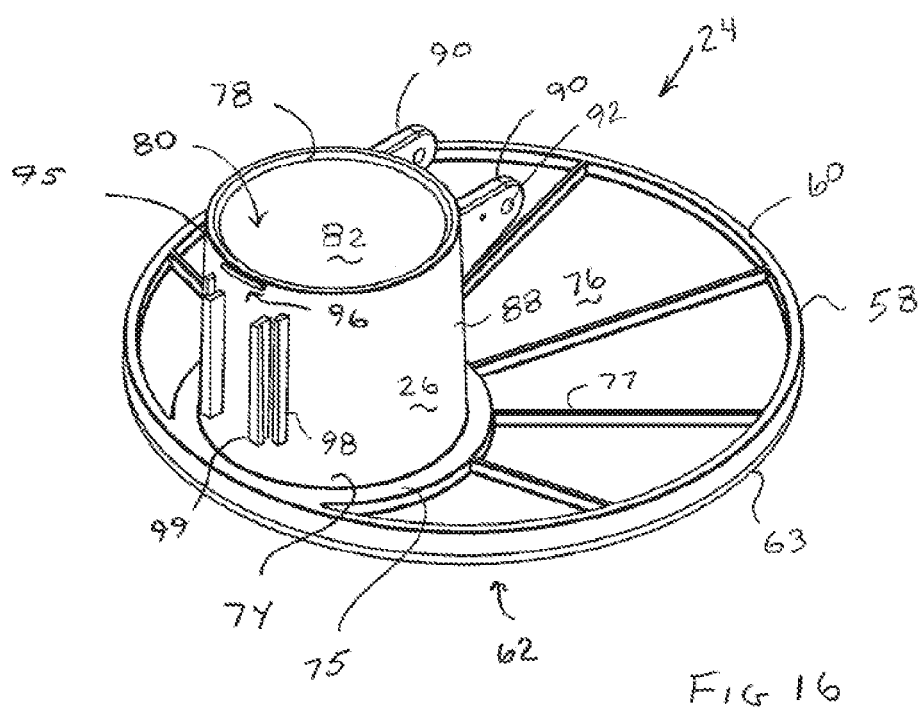
FIG. 16 is a front top right perspective view of the cup plate of the exemplary measuring and dispensing device.
Figure 48:
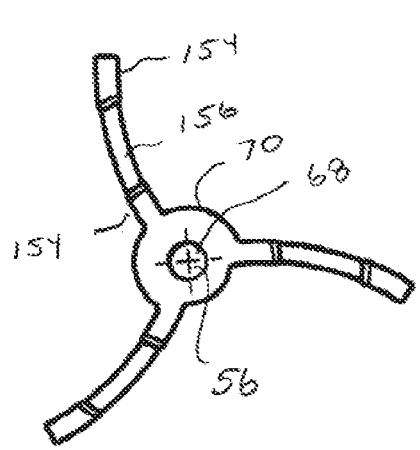
FIG. 48 is a top view of the vane assembly.
Figure 47:
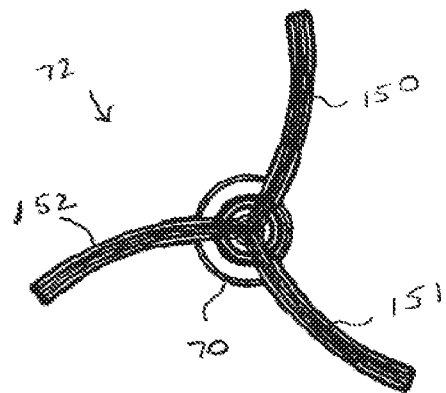
FIG. 47 is a bottom view of the vane assembly.
Figure 49:
FIG. 49 is a cross sectional view of the hub of the vane assembly.
Figure 46:
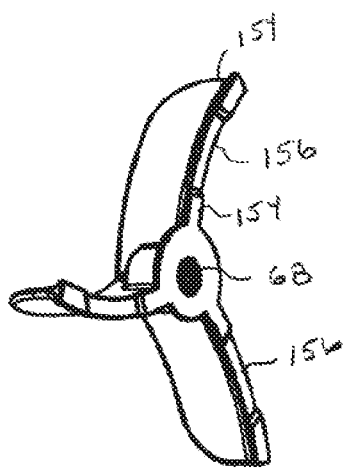
FIG. 46 is a top left perspective view of the vane assembly.
Figure 45:
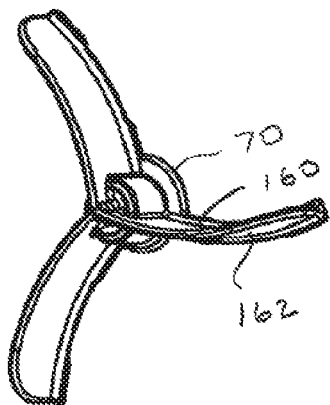
FIG. 45 is a bottom right perspective view of an exemplary vane assembly including vanes and a hub of an exemplary arrangement.

In the exemplary arrangement the cup 26 is bounded by a cup outer wall 88. The cup outer wall is a substantially annular wall that extends from the inner cup side 74 to the cup outlet 80 on the outside of the cup. A pair of disposed ears 90 are positioned in fixed operative connection with the cup outer wall. The ears are components of the exemplary hinge 30. Each of the ears 90 includes openings 92 therein. The ears 90 are configured for accepting a hinge pin 94 therein as shown in FIG. 9 for purposes of rotatably attaching the cup closure 28 in movable rotatable connection with the cup 26. Of course these approaches for mounting the cup closure in operative engagement with the cup are exemplary and in other arrangements other approaches may be used.

In the exemplary arrangement the cup outer wall 88 further includes a substantially radially outward extending projection 95 thereon. The outward extending projection bounds an inward extending recess 96. The recess extends on the cup outer wall 88 and is disposed toward cup face plate 76 below the projection 95. The recess is positioned on an opposed side of the cup outer wall from the ears 90. The projection 95 and recess 96 are components of the exemplary latch and operates in a manner that is later discussed.

The cup outer wall 88 further includes a pair of parallel, laterally disposed outboard projections 98. Outboard projections 98 extend outward along a substantial portion of the cup outer wall intermediate of the inner cup side 74 and the cup outlet 80. A pair of inboard projections 99 extend outward from cup outer wall 88 intermediate of outboard projections 98. Each of the pair of inboard projections 99 does not extend as closely to the cup outlet 80 of the cup 26 as the outboard projections 98 in the exemplary arrangement. Each inboard projection 99 is L-shaped in transverse cross-section. In the exemplary arrangement each inboard projection 99 terminates outwardly from wall 88 in a finger portion 97. Each finger portion 97 as best shown in FIG. 17, extends transversely of the outward direction from the cup outer wall 88, in which outward direction the portions of projections 98 and 99 extend in the area in which they are engaged with the outer wall. Further, each finger portion 97 in cross-section extends toward the respective immediately adjacent outboard projection 98. An elongated space 101 extends between each immediately adjacent inboard projection 97 and outboard projection 98. In the exemplary arrangement the space 101 is configured to accept therein a respective one of the inward facing walls 102 of a guide sleeve 100 which is also part of the exemplary latch 32. Each inward facing wall 102 of the guide sleeve 100 includes therein a closed end notch 103 in which a respective finger portion 97 is positioned in seated relation. Of course it should be understood that this configuration is exemplary, and in other arrangements other configurations may be used.

As shown in FIGS. 23-28 the exemplary cup closure 28 includes a generally circular cup cap portion 104. Cup cap portion 104 is sized to close the cup outlet 80 of the cup 26 when the cup cap portion is positioned in close adjacent relation therewith. A resilient seal 105 extends on the interior side of cup cap portion 104 to help seal the cup closure 28 and the cup outlet 80 when the cup closure is in the closed position. A barrel 106 extends on a side of the cup cap portion 104. The barrel 106 includes an opening 108 that extends therethrough. The barrel 106 is part of the exemplary hinge 30. The barrel 106 is sized to extend between the ears 90 of the cup and the opening 108 is sized to accept the hinge pin 94 therein. This enables the cup closure 28 to rotatably move relative to the cup between a cup closed position in which the cup closure 28 is in close adjacent relation with and seal 105 closes the cup outlet 80, and a cup dispense position in which the cup cap portion 104 is disposed at least partially away from the cup outlet. In the cup dispense position material in the cup interior 82 is enabled to pass outwardly therefrom by gravity through the cup outlet 80 when the cup outlet is directed in a generally vertically downward position. In some exemplary arrangements a torsion spring 110 which is shown in FIG. 9 is positioned to bias the cup closure 28 toward the cup dispense position. Spring 110 is operative to further assist the gravitational force which operates to urge the material downward and to open the cup closure 28 when the latch 32 is operative to enable the cup closure to open. Spring 110 may be useful in scenarios where the material being dispensed is generally lightweight and the gravitational force acting thereon may not be sufficient to rotate the cup closure about the hinge 30. Of course this approach is exemplary and other arrangements other approaches may be used.

The exemplary cup closure further includes in operative connection therewith a pointed projection 112. Projection 112 is part of the exemplary latch 32. Projection 112 extends generally radially inward relative to the axis 56. The projection 112 is configured to engage the recess 96 below outward projection 95 on the cup outer wall 88. The projection 112 is in direct operative connection with the cup closure 28 through a leg portion 114 which extends substantially parallel to the axis. The exemplary leg portion 114 which is also part of the exemplary latch, is comprised of resilient material and configured to bias the projection 112 to engage in the recess 96. The leg portion 114 is also configured to deform during operation of the latch to enable the projection 112 to disengage from the recess 96 so as to enable the cup closure 28 to move from the cup closed position to the cup dispense position. The exemplary leg portion 114 includes a tapered actuator face 116. The tapered actuator face extends in facing relation toward the lid. The tapered actuator face 116 operates in a manner later discussed in detail to enable the latch to change from a condition in which the cup closure 28 is held in the cup closed condition to a condition in which the cup closure is enabled to move from the cup closed position to the cup dispense position. In transverse cross section a recess 117 extends between an inner face of the leg portion 114 and an outer face of the projection 112. The recess 117 is configured to accept projection 97 therein when the cup closure 28 is in the closed position. Of course it should be understood that this configuration of the latch is exemplary and other arrangements other approaches may be used.

As shown in FIGS. 36-44 the exemplary guide sleeve 100 includes a pair of parallel sidewalls 102 which are connected by an outer wall 118 that extends substantially perpendicular to the side walls. The sleeve 100 is comprised of generally rigid deformable material and is a part of the exemplary latch 32. As previously discussed, each side wall 102 is engaged in a respective space 101 that extends between a respective immediately adjacent pair of outboard projections 98 and inboard projections 99 on the cup outer wall 88. Each side wall 102 has an inside face which includes a respective outwardly directed closed end notch 103 extending therein. Each closed end notch 103 is closed at an end face 119. Each side wall 102 further includes an outwardly directed tapered tab 115. Each tapered tab 115 terminates at its inward end in a transversely extending hook face 121. The exemplary tapered tabs are configured to be movable parallel to and in engagement with the inside surfaces of the outboard projections 98 and to extend outward once the hook face 121 of a respective tab has passed beyond an end of a respective outboard projection. The pair of hook faces 121 extending outwardly from the tabs 115, engage the outboard projections 98 and hold the guide sleeve 100 in the operative position. Also in the operative position of the guide sleeve 100, a respective finger portion 97 of an inboard projection 99 is engaged in a respective closed end notch 103 and is in abutting engagement with the end face 119 of the notch. As a result the projections 98, 99 hold the guide sleeve in engaged relation with the cup outer wall 88 and the end faces of the notches further position the guide sleeve in the operative position. In the exemplary arrangement the cup outer wall 88 and the inner faces of the sidewalls 102 and outer wall 118 of the guide sleeve bound a guide opening 120. The opening 120 is an elongated opening that extends substantially parallel to the axis. A pushrod 122 is movable in guided relation in the opening 120 in a manner later discussed.

Sleeve outer wall 118 includes an inward facing wall surface 124. The inward facing wall surface 124 has an inward facing spring engaging projection 126 extending therefrom. The exemplary spring engaging projection 126 extends part way to the cup outer wall 88 in the opening 120. The spring engaging projection 126 terminates at a distal portion which includes a positioning pin 128. The positioning pin 128 extends in a direction substantially parallel to the axis and the inward facing wall surface 124. The positioning pin 128 is sized to extend within a central spring opening of a coil compression spring 130. The coil compression spring includes spring coils that extend in surrounding relation of the central spring opening 131 which extends the longitudinal length of the spring. In the exemplary arrangement the positioning pin 128 is configured to extend in the central spring opening 131 of spring 130 at a proximal end 132 of the spring. The positioning pin helps to hold the spring 130 in position within the latch and in operative connection with the pushrod 122 in a manner that will be later discussed.

FIGS. 29-35 show the exemplary pushrod 122 which is a part of the exemplary latch 32. Pushrod 122 includes a substantially rectangular body 134. The rectangular body 134 includes an elongated cavity 136. Cavity 136 is sized for housing the spring 130 therein. The exemplary cavity 136 includes a positioning pin 138 at an end thereof. The positioning pin 138 is configured to engage the central spring opening 131 of spring 130 at a distal end 140 thereof. An end of the elongated cavity 136 opposed of the end that includes the positioning pin 138, includes a cutout 141. In the exemplary arrangement the cutout 141 is configured for receiving the spring engaging projection 126 of the sleeve 100 therein. As a result in the exemplary arrangement the spring 130 is held within the cavity 136 between the positioning pins 128 and 138. Of course this approach is exemplary and other arrangements other approaches may be used.

The exemplary pushrod 122 terminates at an end that is immediately adjacent to the lid 20 at a foot 142. As shown in FIG. 9 the exemplary foot 142 extends generally radially outward relative to the axis 56. The exemplary foot 42 includes a follower surface 144. The follower surface moves in substantially engaged relation with the rim 48 as the cup plate and the lid rotate relative to one another. In the exemplary arrangement the follower surface 144 is bounded laterally on each side by tapered side surfaces 146. The tapered side surfaces 146 are tapered outwardly with increased distance away from the rim 48. The tapered side surfaces 146 facilitate the movement of the pushrod 122 by engagement with the cam lobe 34 as the cup plate rotates through the angular positions in which the foot 142 engages the cam lobe. In other exemplary arrangements the pushrod may include only one tapered side surface. This may be done in situations where the cup plate is configured to rotate in only one rotational direction relative to the lid. For example in the exemplary arrangement of the rim 48 shown in FIGS. 13 and 14 for example, the cam lobe 34 has a gradually tapered ramp surface 35 on a first lateral side thereof and an abrupt vertically extending stop surface 37 on the opposed lateral side. As a result in such an exemplary arrangement a tapered side surface 146 may be used only on the side of the foot 142 that initially engages the ramp surface 35 as the cup plate 24 is rotated relative to the lid 20 in a clockwise direction as shown in FIG. 3. The opposite lateral side of the foot may have a flat or otherwise configured surface that positively engages the stop and prevents rotation in the counterclockwise direction as shown in FIG. 3. Of course it should be understood that these configurations are exemplary and in other arrangements other approaches may be used.

The exemplary pushrod 122 further includes a tapered projection engaging face 148. The exemplary tapered projection engaging face faces angularly away from the lid and is configured to slidingly engage the tapered actuator face 116 of the leg portion 114 on the cup closure 28. As later discussed, when the latch is in the latched position the movement of the pushrod 122 parallel to the axis 56 and in a direction away from the lid 20 causes the tapered projection engaging face 148 to engage and move in sliding relation with the tapered actuator face, and to deform the leg portion 114 sufficiently radially outwardly so that the projection 112 disengages from the recess 96 and unlatches the latch. Of course it should be understood that these features of the pushrod 122 and other components which make up the latch 32 are exemplary, and in other arrangements other types of components and configurations may be utilized.

The exemplary vane assembly 72 is shown in greater detail in FIGS. 45-49. In the exemplary arrangement the vane assembly 72 includes three vanes 150, 151, 152 that extend in equally angularly spaced relation and radially outward from the axis 56. In the exemplary arrangement each of the vanes 150, 151, 152 extend radially outward from the hub 70. The vanes rotate in the circular lid inner recess 42 of the lid 20. In the exemplary arrangement each of the vanes is sized so that as the vanes rotate the radially outward ends of the vanes extend radially at least partially across the lid plate opening 52. In some exemplary arrangements this facilitates maintaining the flowable character of the material adjacent to the lid plate opening and helps to assure that the material will flow therethrough. Of course it should be understood that while in the exemplary arrangement a set of three vanes is used, in other exemplary arrangements different numbers and configurations of vanes may be utilized. This may include for example other numbers comprising one or more vanes.

In the exemplary arrangement each of the vanes 150, 151, 152 includes in transverse cross-section a plurality of vane lid abutting surfaces 154. In the exemplary arrangement the vane lid abutting surfaces of each of the vanes extend radially outward from the hub 70 and moves in flush abutting relation with the inner lid plate face 44. Each of the vanes of the exemplary arrangement also include at least one vane recess 156. Each vane recess extends radially between each immediately adjacent pair of vane lid abutting surfaces 154. Each vane recess 156 causes the area of the vane in which the recess extends to be disposed away from the inner lid plate face 44. In some exemplary arrangements the vane recesses may be sized so as to enable the material to pass between the vane and the inner lid plate face through the recess. Various numbers of vane lid abutting surfaces and vane recesses may be utilized in exemplary arrangements. In the exemplary arrangement this configuration of the vane assembly 72 reduces the risk of material clinging to and accumulating on the inner lid plate face which might otherwise interfere with operation of the vanes or the device. Of course it should be understood that this approach is exemplary and other arrangements other approaches may be used.

In the exemplary arrangement each vane includes substantially parallel vane surfaces 160, 162. Each vane surface extends substantially the entire radial length of the vane surface substantially parallel to the axis, and each vane surface is curved such that rotation of the vane assembly 72 in a first rotational direction causes material in contact with a leading vane face surface (as the vane assembly rotates) to be urged by the curvature the vane radially outwardly in a direction away from the axis 56. Further in the exemplary arrangement the vane assembly is configured such that rotation in a second rotational direction that is opposed of the first rotational direction urges material in contact with the leading vane face surface to move radially inward toward the axis. This configuration of the exemplary arrangement further helps to assure that the material in contact with the vane assembly 72 can be maintained in a flowable condition by movement of the cup plate 24 relative to the lid 20 in opposed rotational directions. Of course it should be understood that this configuration is exemplary and in other arrangements other approaches may be used.

Figure 50:
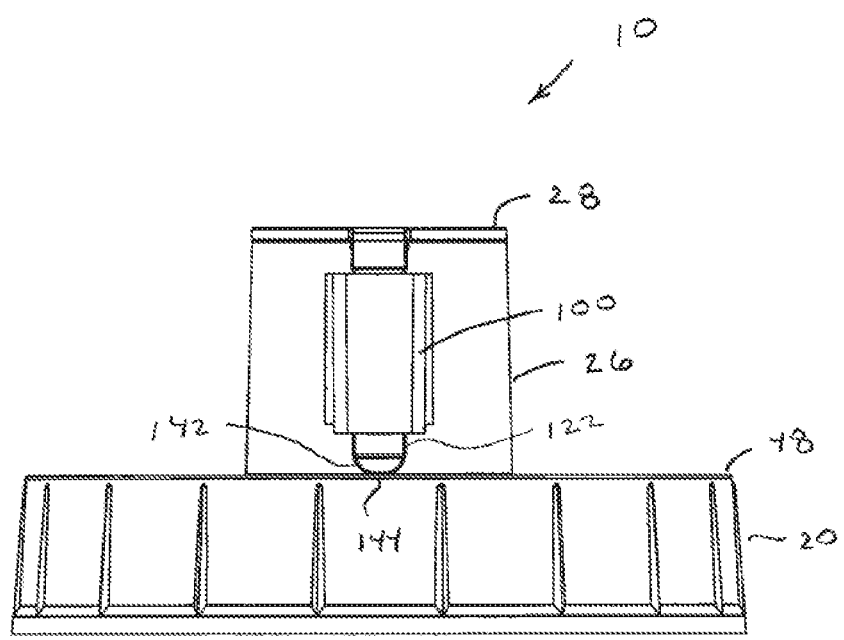
FIG. 50 is a front view of the exemplary measuring and dispensing device.
Figure 51:
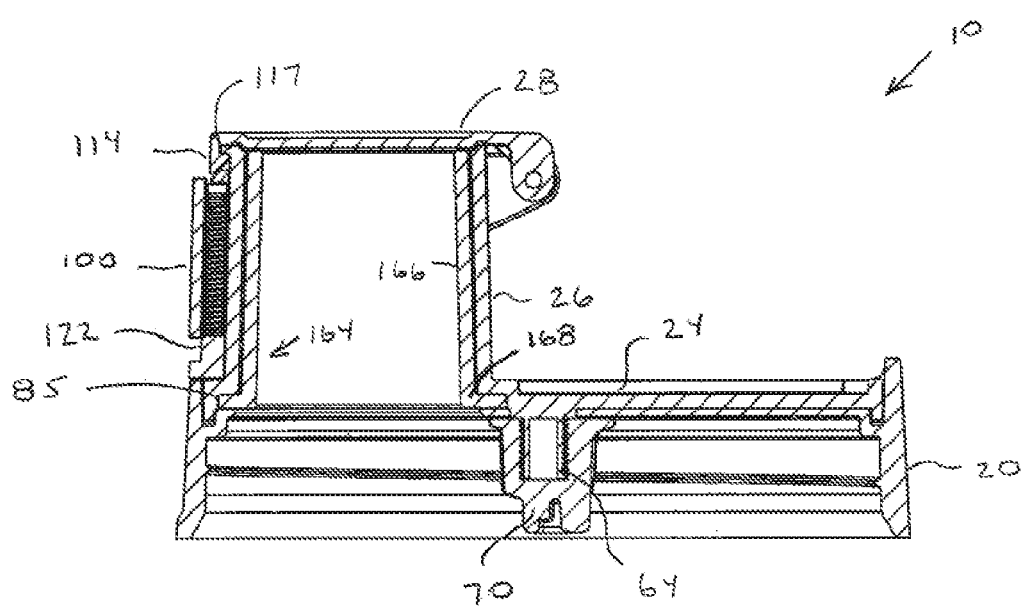
FIG. 51 is a right side cross-sectional view of the device.
Figure 52:
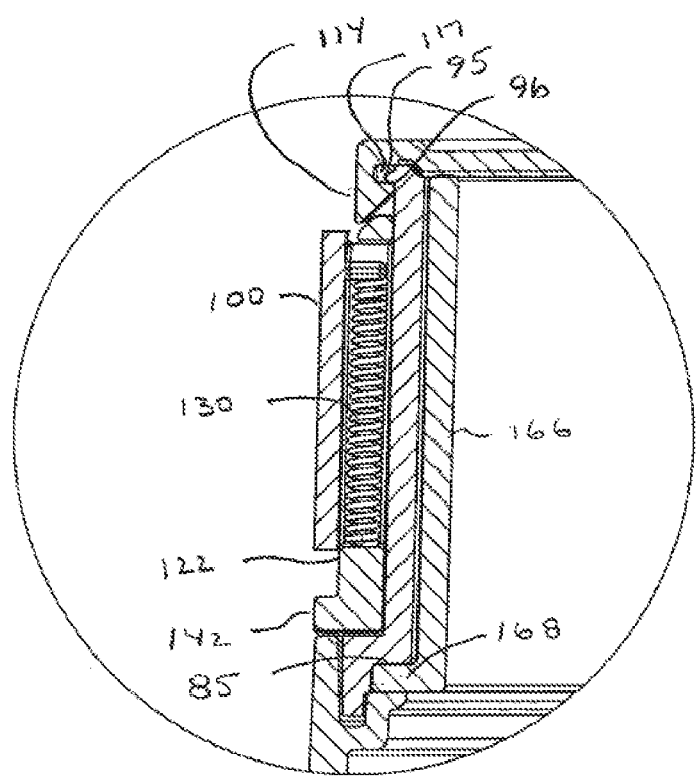
FIG. 52 is an enlarged cross sectional view of the latch.

The operation of the exemplary measuring and dispensing device 10 is now further explained with regard to FIGS. 50-57. As shown in FIG. 50 the follower surface 144 of the foot 142 of the pushrod 122 moves in engagement with the outer surface of the rim 48 of the lid 20. In the exemplary arrangement the biasing force of the spring 130 operates to maintain engagement of the follower surface 144 with the rim 48. With the cup closure 28 in the cap closed position as shown in FIGS. 50-52 the projection 112 is in the interengaging relation with the recess 96 adjacent the projection 95 in the cup outer wall 88.

Figure 53:
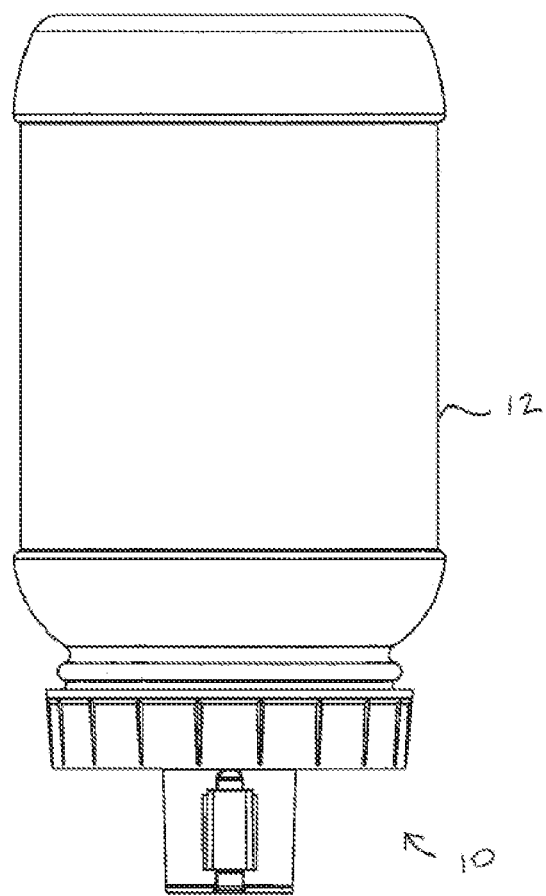
FIG. 53 is a right side view of the container and the measuring and dispensing device in a position for dispensing material.
Figure 54:
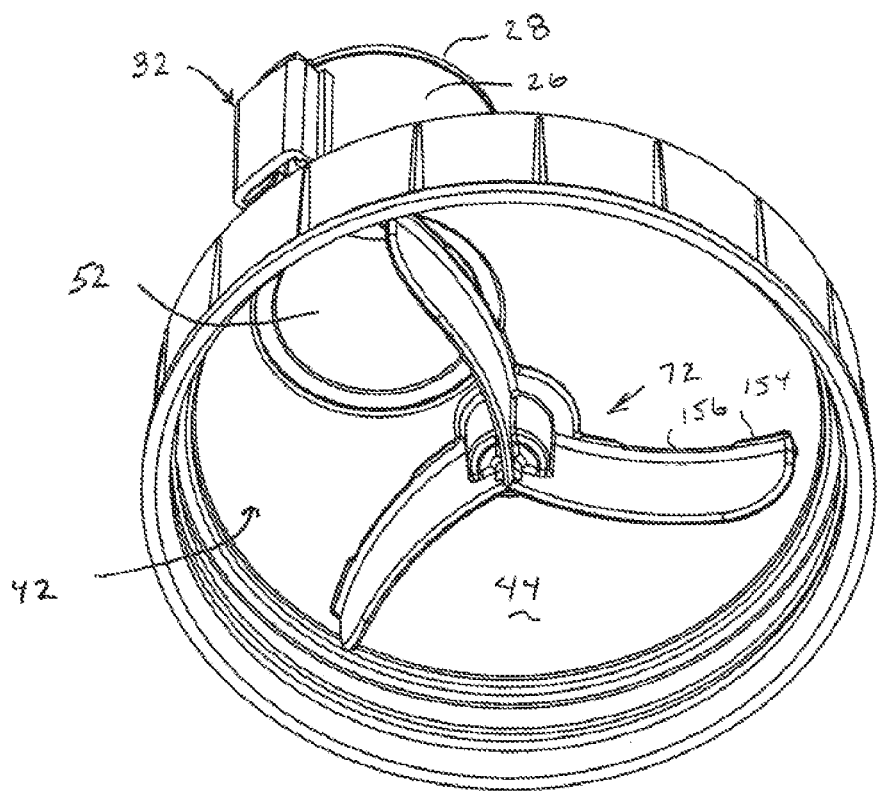
FIG. 54 is a bottom right perspective view of the lid and the cup plate in a cup fill enabled orientation.
Figure 55:
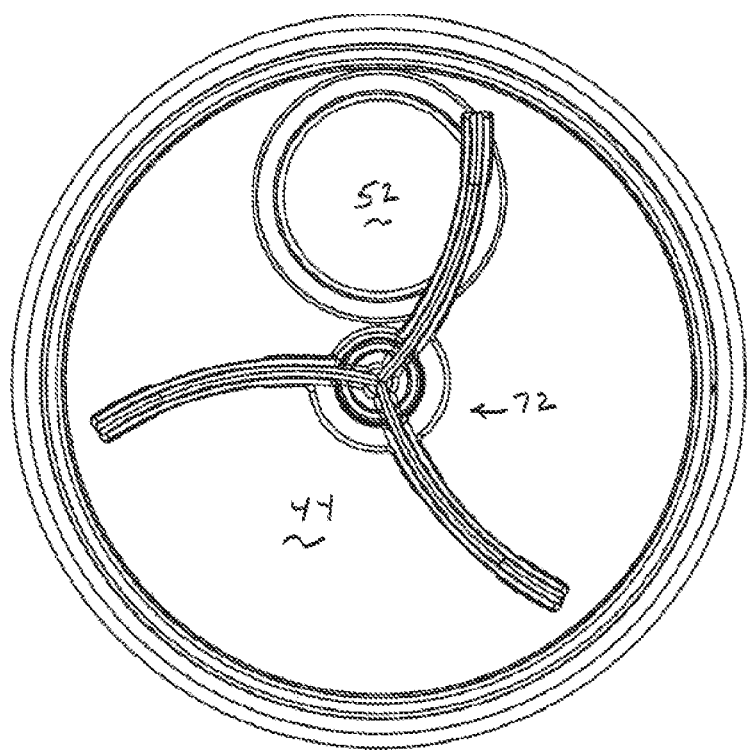
FIG. 55 is a bottom view of the lid and cup plate in a cup fill enabled orientation.

With the container 12 inverted so that the container opening 16 is directed downwardly as shown in FIG. 53, material in the container flows in response to the force of gravity into the circular inner lid recess 42 within the device 10, and against the inner lid plate face 44. In the exemplary arrangement when the lid plate opening 52 in the lid plate and the cup plate opening 84 in the cup plate 24 are relatively manually moved to be in aligned overlapping relation due to the relative rotational positions of the lid 20 and the cup plate 24, the material is enabled to flow downwardly from the container and to fill the cup interior 82 from the outer lid plate face 46 to the inner face of the cup cap portion 104 of the cup closure 28. In the exemplary arrangement when the cup closure and the cup plate are in this cup fill enabled orientation, the measured volume of the material is enabled to fill the known measured volume of the cup interior 82. The interengaged projection 122 and recess 96 of exemplary latch 32, are operative to hold the cup cap portion of cup closure 28 closed against the gravitational force applied by the material acting on the inner face of the cup closure 28.

Figure 56:
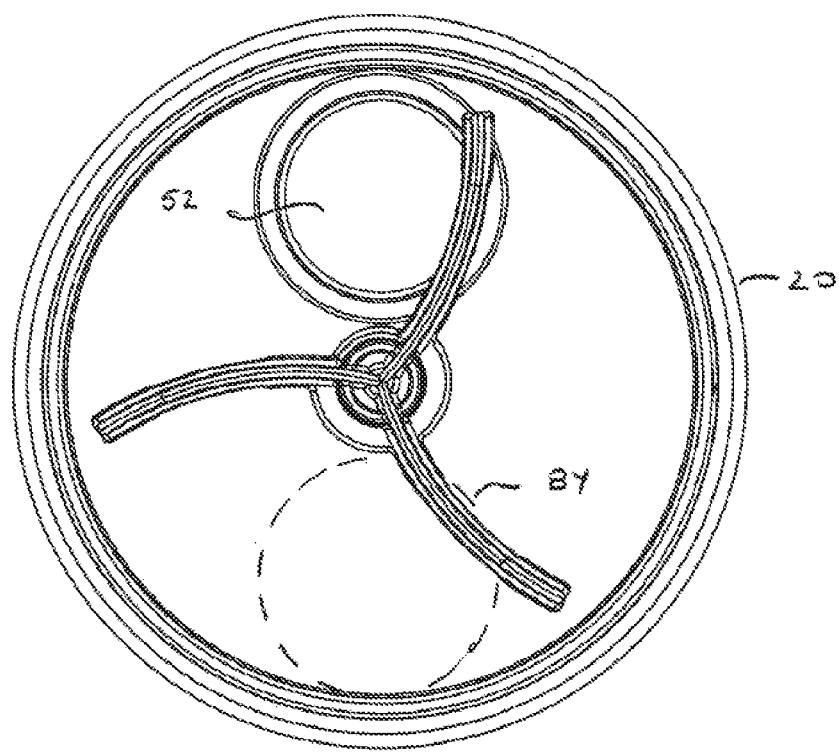
FIG. 56 is a bottom view of the lid and cup plate in a cup fill prevented/release orientation and in which the material in the cup interior is enabled to be dispensed.
Figure 57:
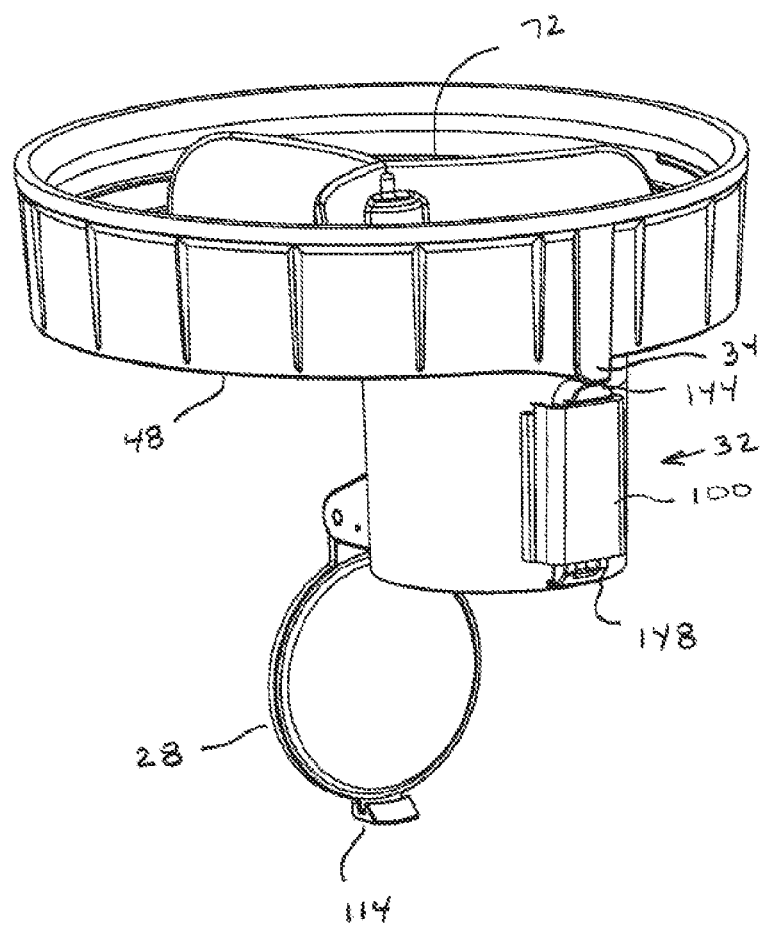
FIG. 57 is a bottom front left perspective view of the exemplary measuring and dispensing device in a cup fill prevented/release orientation and with the cup closure in the cup dispense position.
Figure 61:
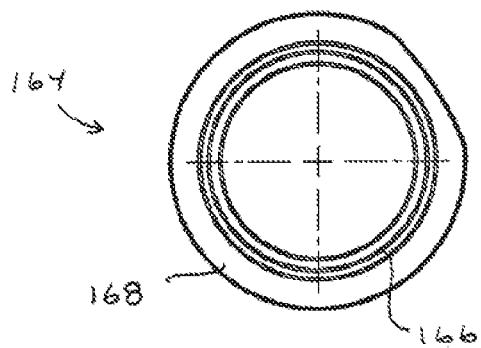
FIG. 61 is a top view of the cup insert.
Figure 62:
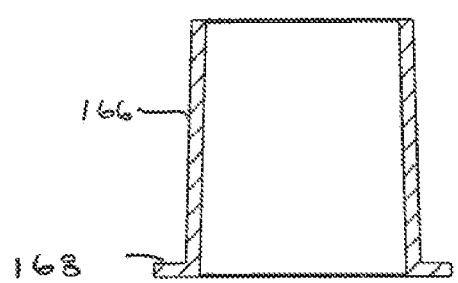
FIG. 62 is a sectional view of the cup insert along the lines 62-62 in FIG. 59.
Figure 59:
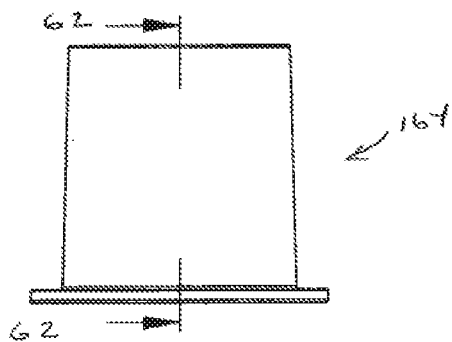
FIG. 59 is a front view of the cup insert.
Figure 58:
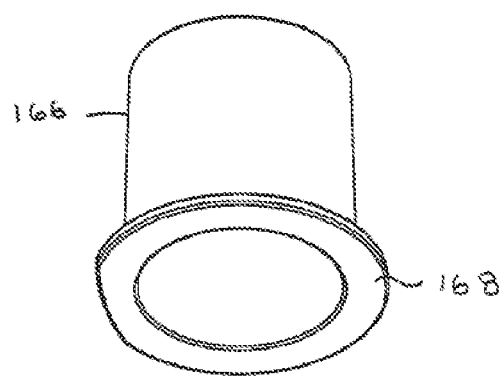
FIG. 58 is a bottom right perspective view of an exemplary cup insert.
Figure 60:
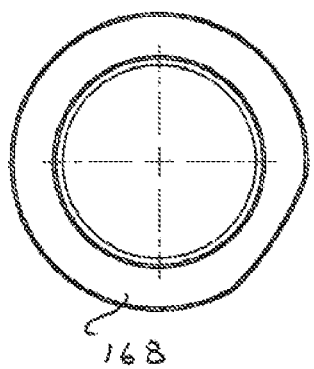
FIG. 60 is a bottom view of the cup insert.

Relative rotational movement of the cup plate 24 relative to the lid 20 by manual engagement with the cup is operative to cause the lid plate opening 52 to be angularly disposed from and no longer in overlapping relation with the cup plate opening 84. As can be appreciated, this causes the measured volume in the cup interior 82 that is between the outer lid plate face 46 and the inner face of the cup closure 28 to be held captured in the cup interior 82. Relative movement of the cup plate and the lid from the cup fill enabled orientation to a cup fill prevented/release orientation which is angularly disposed 180° therefrom as represented in FIG. 56, is operative to cause the latch to enable the cup closure 28 to move from the cup closed position to the cup dispense position. This is caused in the exemplary arrangement by the follower surface 144 of the pushrod 122 moving into engagement with the exemplary ramp surface 35 of the cam lobe 34 on the rim 48 as shown in FIG. 57. Such engagement with the cam lobe is operative to cause the pushrod 122 to be displaced in a direction parallel to the axis and away from the lid inner recess 42 shown in FIG. 52 against the force of the spring 130. As the pushrod 122 moves within the opening 120 bounded by sleeve 100, the tapered projection engaging face 148 on the pushrod engages the tapered actuating face 116 of the leg portion 114. Such movable sliding engagement is operative to cause the projection 112 to move radially outwardly and disengage from the recess 96 adjacent the outward projection 95 on the outer surface of the cup 26. As a result the cup closure 28 is operative responsive to the biasing force of the spring 110 and the weight of the material in the cup interior 82 to cause the cup closure 28 to move from the cup closed position to the cup dispense position as represented in FIG. 57. As a result of the measured volume of the material held in the cup interior is dispensed therefrom through the cup outlet 80.

In the exemplary arrangement the closure member 28 is readily moved from the cup dispense position to the cup closed position once the cup plate and the lid are relatively rotated so that the follower surface 144 on the pushrod 122 is no longer in engagement with the cam lobe 34. With the cup closure 28 in the cup closed position, the device may then be operated to again dispense the measured volume of the material by placing the cup plate and the lid in the cup fill enabled orientation to fill the cup with material, inverting the container, and then relatively rotationally moving the cup plate and the lid to the cup fill prevented/release orientation in which the cup closure 28 is automatically caused to be opened. Of course as previously discussed, as the cup plate 24 moves relative to the lid 20 the vane assembly 72 is operative to help to assure that the material in the lid inner recess 42 remains in a flowable condition to facilitate the dispensing thereof. Further in the exemplary arrangement the lid 20 and cup plate 24 may be moved rotationally in both opposed rotational directions a distance somewhat less than 360° between the orientations in which the cup interior 82 is filled so that the vanes of the vane assembly 72 can operate to urge the material radially inward as well as radially outward in the lid inner recess so as to maintain the material in a flowable condition and to reduce the risk of clumping, which may cause the material to no longer be readily flowable. Of course as previously discussed, in the exemplary arrangement the cup plate is rotatably movable relative to the lid in a single rotational direction to cause the material to be dispensed. Movement in an opposed direction from the rotational direction in which dispense can be achieved is limited by engagement of the foot 142 with the stop surface 37 of the cam lobe 34. The exemplary arrangement helps to assure suitable operation, long service life and accurately dispensing a measured volume of the material on a repeatable basis. The arrangement further helps to assure that the threads 66 on the shaft 64 are most often exposed to a force that maintains the vane assembly 72 in engaged relation with the shaft 64 by having the resistance that the vanes encounter as a result of engaging the material act in a direction that keeps the vane assembly engaged with the threads. Of course it should be understood that these configurations are exemplary and in other arrangements other approaches may be used.

In the exemplary arrangement, the latch 32 is configured to enable the cup closure 28 to be opened manually when the relative angular orientations of the lid 20 and the cup plate 24 are in other than the cup fill prevented/release orientation. This is accomplished in the exemplary arrangement by the configuration of the cup closure 28 and the leg portion 114 which are enabled to be manually manipulated so as to move the projection 112 out of interengaging relation with the recess 96. This may be done for example, for purposes of cleaning the cup interior 82 or for inspection purposes to assure that the components of the device are operating properly and unobstructed. Further in some exemplary arrangements a user may wish to manually open the cup closure 28 when the cup plate is in the cup fill enabled orientation so that material may be directly poured from the cup outlet 80. This may be desirable in certain circumstances when the user wishes to remove an amount of material from the container that is different from the measured volume. In addition as previously discussed, the exemplary latch also enables placing the projection 112 and the recess 96 in interengaging relation to place the cup closure 28 in the cup closed position in any of the relative angular positions of the lid and cup plate except when the pushrod 122 is in engagement with the cam lobe 34. However, it should be understood that in other arrangements other types of latch arrangements may be utilized. This may include latch arrangements that do not provide the capability for manually opening the cup closure separately from actuation of the latch when the cup plate and lid are in the cup fill prevented/release orientation in which the material in the cup interior is to be dispensed. Further it should be understood that the particular configuration of the interengaging projection and recess of the exemplary arrangement are merely an example of a latch arrangement that may be utilized for purposes of holding the cup closure in the closed position during certain portions of the operation cycle of the device, and then opening the cup closure to dispense material during other portions of the operation cycle of the device. The latch structures and operation shown and described herein are merely exemplary, and in other arrangements other structures and latching arrangements may be utilized.

Further it should be understood that while in the exemplary arrangement the cup closure 28 is in rotatable hinged connection with the cup plate and the cup, in other exemplary arrangements other relatively movable connections between the cup and the cup closure may be utilized. These may include, for example connections that provide for the displacement of the cup closure through an internal pushrod or valve stem structure that extend within the cup interior, and which is movable outwardly away from the lid so as to displace the cup closure away from the outlet about the entire periphery of the outlet opening. It should be understood that numerous different types of structures and arrangements for placing the cup closure and the cup in relatively movable operative connection for purposes of opening and closing the cup interior may be utilized in various arrangements. Also it should be understood that while in the exemplary arrangement the cup fill enabled orientation and the cup fill prevented/release orientation in which the material is dispensed, are disposed 180°, in other arrangements other angular relationships between the fill and dispense positions may be used.

Further as previously discussed, in the exemplary arrangement the cup interior 82 is a measured fixed volume that is dispensed during each operating cycle of the device. In some exemplary arrangements, users who wish to dispense different fixed measured volumes of material may acquire a plurality of devices each of which is usable dispense a different fixed measured volume. However in other exemplary arrangements structures and features may be provided so as to enable changing of the fixed measured volume that is dispensed from the device. These may include for example different cup inserts that may be releasably positioned in the cup interior of the cup. Such inserts may be releasably engaged with the inner wall of the cup or the cup closure for example, to selectively vary the measured volume of the cup interior area. Such inserts may be of any suitable size and configuration as appropriate to not interfere with the ability of the flowable material to flow into and out of the cup interior area during each operating cycle.

FIGS. 59-62 show an exemplary cup insert generally indicated 164. The exemplary cup insert includes an annular sleeve 166. The annular sleeve extends from a substantially circular base flange 168. As shown in FIGS. 51 and 52 for example, the cup insert is extendable in the interior of the cup 26 and close-fitting relation. In the installed position the annular sleeve 166 extends in abutting engagement with the inner surface of the cup. The base flange 168 extends in the annular recess 85 that surrounds lid plate opening 52. In the exemplary arrangement the base flange 168 is sized so that the face of the base flange that faces the outer lid recess is in aligned coplanar relation with inner lid plate face 44. This facilitates the ability of the vane lid abutting surfaces of the vanes to move across the base flange without catching or sticking. In the exemplary arrangement the cup insert 164 is comprised of generally rigid resilient material so that once the cup insert is inserted within the cup interior the resilient biasing force of the annular sleeve 166 against the cup inner wall 86 holds the cup insert within the interior of the cup until it is deliberately manually removed.

As can be appreciated, with the exemplary cup insert installed in the cup interior the measured volume of material that is dispensed in each cycle of the device 10 is reduced to the volume of the annular sleeve 166 between the flange portion 168 and the cup outlet 80. Further by changing the transverse thickness of the wall which bounds the interior of the annular sleeve, or alternatively by placing projections or other structure within the interior area of the sleeve, the measured volume of material that is dispensed from the device with each rotation can be changed. Further in some exemplary arrangements the device 10 may be provided with a plurality of different cup inserts each of which has a different measured volume so as to enable user to selectively install a sleeve that corresponds to the desired measured volume of material that they wish to dispense. Of course it should be understood that these approaches are exemplary and in other arrangements other approaches may be used.

In some other exemplary arrangements the device may include replaceable cups that are in releasably fixed engagement with the cup plate. Such cups may be releasably attached to the cup plate in threaded or other temporarily fixed connection therewith. Such replaceable cups may include different fixed cup interior volumes. Such replaceable cups may be utilized in other exemplary arrangements to provide different measured volumes of material during the operating cycle of the device.

In some exemplary arrangements the components of the device such as the lid, cup plate, closure member, hinge and/or vane assembly may be assembled in permanently fixed connection. Such construction may help to assure that the components maintain their desired optimum positions and orientation throughout the life of the device. However in other exemplary arrangements provision may be made to enable one or more of such components to be disassembled and removed from engagement with the other components such as for periodic cleaning or for repair or replacement purposes. In such exemplary arrangements for example, the vane assembly and the shaft in connection with the cup plate may be configured to be in releasable connection through the threaded connection described herein or other arrangement which enables the disconnection thereof. In some exemplary arrangements other releasable connection methods such as fasteners, clips, resilient interengaging projections or other fastening devices may be utilized for purposes of enabling such components to be held in fixed yet releasable connection. Such releasable engagement configurations may also be utilized with other components of different latch structures such as structures which hold the cup closure in operative engagement with the cup. Further in exemplary arrangements components of the latch or other structures that are included in exemplary arrangements may be made to be readily disassembled and reassembled for cleaning, repair or inspection purposes. Of course such approaches are exemplary and other arrangements other approaches may be used.

Further while the exemplary arrangements may be used to provide accurate repeatable dispensing of a measured volume of human consumable material, dispensing devices utilizing the features and principles of the described exemplary arrangements may be used for purposes of providing measuring and/or dispensing of other types of flowable materials. In addition the principles described in connection with the exemplary arrangements may be applied to other types of dispensing devices that are suitable for the dispense of semisolid or liquid materials. Further it should be understood that the container construction that is used in connection with the exemplary arrangement of the device may differ in other exemplary arrangements, and that in such other arrangements other approaches for attaching the device to a container opening, providing the delivery of material to be dispensed through the device and/or for operatively connecting such a device to a container from which material is supplied to the device, may be used.

Thus the exemplary arrangements of the measuring and dispensing device that have been shown and/or described herein achieve improved operation, eliminate difficulties encountered in the use of prior devices, and attain the useful results described herein.

In the foregoing description certain terms have been used for brevity, clarity and understanding. However, no unnecessary limitations are to be implied therefrom because such terms are used for descriptive purposes and are intended to be broadly construed. Moreover, the descriptions and illustrations herein are by way of examples and the inventive features are not limited to the exact features that have been shown and/or described.

Further in the following claims any feature described as a means for performing a function shall be construed as encompassing any means known to those skilled in the art as being capable of carrying out the recited function and shall not be deemed limited to the particular means shown or described for performing the recited function in the foregoing description, or mere equivalents thereof.

Having described features, discoveries and principles of the exemplary arrangements, the manner in which they are constructed and operated, and the useful results and advantages attained thereby, the new and useful structures, devices, elements, arrangements, parts, combinations, systems, equipment, operations, methods, processes and relationships are set forth in the appended claims.

We claim:

1. Apparatus comprising:
a measuring and dispensing device configured to selectively dispense a measured volume of flowable solid human consumable material from a container,
wherein the container includes a container interior configured to house the material, and an externally threaded container opening that extends through the container to the container interior, and through which container opening the material is enabled to flow out of the container interior responsive to gravity,
the device including:
a lid, wherein the lid includes
a ring portion, wherein the ring portion bounds a circular inner lid recess,
wherein the ring portion that bounds the circular inner lid recess includes internal threads, wherein the internal threads are configured to releasably matingly engage the externally threaded container opening,
a circular lid plate portion, wherein the lid plate portion
substantially closes the circular inner lid recess,
includes a circular substantially planar outer lid plate face,
wherein the outer lid plate face includes a lid plate opening, wherein the lid plate opening extends through the circular lid plate portion to the circular inner lid recess,
a cup plate,
wherein the cup plate includes,
a circular substantially planar inner cup plate face, wherein the cup plate is rotatably movably mounted in operative connection with the lid,
wherein the cup plate is rotatably movable about an axis and with the inner cup plate face in operatively abutting connection with the outer lid plate face,
a cup, wherein the cup includes an inner cup side and an opposed outer cup side, wherein the inner cup side is in operative fixed connection with the cup plate, and wherein the outer cup side includes a cup outlet,
wherein the cup extends outwardly on an opposed side of the cup plate from the inner cup plate face,
wherein the cup bounds a cup interior, wherein the cup interior has an interior volume that corresponds to the measured volume,
wherein the cup plate includes a cup plate opening, wherein the cup plate opening extends through the cup plate from the inner cup plate face to the cup interior at the inner cup side,
wherein the cup plate opening is disposed radially away from the axis,
wherein the cup plate and the lid are relatively rotationally movable between
a cup fill enabled orientation, wherein in the cup fill enabled orientation the cup plate opening and the lid plate opening are in overlapping relation such that material is enabled to flow out from the container interior to the cup interior,
a cup fill prevented/release orientation, wherein in the cup fill prevented/release orientation the cup plate opening is angularly disposed away from the lid plate opening such that no material is enabled to flow out from the container interior to the cup interior,
a cup closure, wherein the cup closure is movably mounted in operative connection with the cup,
wherein the cup closure is movable between
a cup closed position, wherein in the cup closed position the cup closure closes the cup outlet,
a cup dispense position, wherein in the cup dispense position the cup closure is disposed from the cup outlet such that material in the cup interior is enabled to flow out of the cup through the cup outlet, a latch, wherein the latch is in operative connection with the cup closure, the cup plate and the lid,
wherein when the cup plate and lid are in the cup fill enabled orientation the latch is operative to cause the cup closure to be held in the cup closed position,
and wherein the latch is operative when the cup plate and lid are in the cup fill prevented/release orientation to cause the cup closure to not be held in the cup closed position and to enable the cup closure to move from the cup closed position to the cup dispense position,
whereby with the lid and cup plate in the cup fill enabled orientation, the cup interior area is enabled to be filled by gravity with material from the container interior while the cup closure is held by the latch in the cup closed position,
and thereafter with the material in the cup interior and the cup plate and lid in the cup fill prevented/release orientation, the latch causes the cup closure to not be held in the cup closed position by the latch and enables the cup closure to move to the cup dispense position in which the measured volume of material in the cup interior area is enabled to be dispensed by gravity from the cup outlet.

2. The apparatus according to claim 1
and further comprising:
at least one vane, wherein the at least one vane extends in the circular inner lid recess,
wherein the at least one vane is in operative connection with the cup plate and is rotatable about the axis,
wherein the at least one vane is rotatably movable in the circular inner lid recess and extends radially from the axis at least partially across the lid plate opening.

3. The apparatus according to claim 2
and further comprising:
a hub, wherein the at least one vane extends radially outward from the hub,
wherein the cup plate is in operative connection with a shaft that extends along the axis,
wherein the circular lid plate portion includes an axially aligned lid opening, wherein the shaft extends through and is rotatable within the axially aligned lid opening,
wherein the hub is in operative attached connection with the shaft,
whereby the at least one vane is rotatable with rotation of the cup plate.

4. The apparatus according to claim 3
wherein the at least one vane includes a plurality of equally angularly spaced vanes.

5. The apparatus according to claim 3
wherein the circular lid plate portion includes a substantially planar inner lid plate face opposed of the outer lid plate face,
wherein each at least one vane includes a plurality of radially spaced apart vane lid abutting surfaces that extend parallel to and that move in abutting relation with the inner lid plate face, and wherein a vane recess extends radially intermediate of each pair of immediately adjacent vane lid abutting surfaces.

6. The apparatus according to claim 5
wherein each vane includes a pair of opposed parallel vane face surfaces, wherein each vane face surface extends substantially parallel to the axis,
and wherein each vane face surface is curved such that
rotation of the vane in a first rotational direction is operative to cause material in contact with a leading vane face surface to be urged radially outwardly away from the axis, and
rotation of the vane in a second rotational direction opposed of the first rotational direction is operative to cause material in contact with the leading vane face surface to be urged radially inwardly toward the axis.

7. Apparatus comprising:
a measuring and dispensing device configured to selectively dispense a measured volume of flowable solid human consumable material from a container,
which container includes a container interior configured to house the material, and an externally threaded container opening that extends through the container to the container interior, and through which container opening the material is enabled to flow out of the container interior responsive to gravity,
the device including:
a lid, wherein the lid includes
a ring portion, wherein the ring portion bounds a circular inner lid recess,
wherein the ring portion that bounds the circular inner lid recess includes internal threads, whereby the internal threads are configured to releasably matingly engage the externally threaded container opening,
a circular lid plate portion, wherein the lid plate portion substantially closes the circular inner lid recess, and includes a circular substantially planar outer lid face,
wherein the outer lid plate face includes a lid plate opening, wherein the lid plate opening extends through the circular lid plate portion to the circular inner lid recess,
a cup plate, wherein the cup plate includes
a circular substantially planar inner cup plate face,
wherein the cup plate is rotatably movably mounted in operative connection with the lid, wherein the cup plate is rotatably movable about an axis and with the inner cup plate face in operatively abutting connection with the outer lid plate face,
a cup,
wherein the cup includes an inner cup side and an opposed outer cup side, wherein the inner cup side is in operatively fixed connection with the cup plate, and wherein the outer cup side includes a cup outlet,
wherein the cup extends outwardly on an opposed side of the cup plate from the inner cup plate face,
wherein the cup bounds a cup interior, wherein the cup interior has an interior volume that corresponds to the measured volume,
a cup plate opening,
wherein the cup plate opening extends through the cup plate from the inner cup plate face to the cup interior at the inner cup side,
wherein the cup plate opening is disposed radially away from the axis,
wherein the cup plate is operatively rotationally movable relative to the lid between
a cup fill enabled orientation,
wherein in the cup fill enabled orientation the cup plate opening and the lid plate opening are in overlapping relation whereby the material is enabled to flow out from the container interior to the cup interior, and a cup fill prevented/release orientation,
wherein in the cup fill prevented/release orientation the cup plate opening is angularly disposed away from the lid plate opening whereby no material is enabled to flow out from the container interior to the cup interior, a cup closure,
wherein the cup closure is in operatively movably mounted connection with the cup, and is movable between
a cup closed position, wherein in the cup closed position the cup closure closes the cup outlet, and
a cup dispense position, wherein in the cup dispense position the cup closure is disposed from the cup outlet whereby material in the cup interior is enabled to flow out of the cup through the cup outlet, a latch,
wherein the latch is in operative connection with the cup, the cup closure, and the lid,
wherein in the cup fill enabled orientation the latch is operative to hold the cup closure in the cup closed position,
wherein rotation of the cup plate from the cup fill enabled orientation to the cup fill prevented/release orientation is operative to cause the latch to automatically cause the cup closure to be changed from the cup closed position to the cup dispense position, whereby in the cup fill enabled orientation, the cup interior area is enabled to be filled by gravity with material from the container interior while the cup closure is held by the latch in the cup closed position, and thereafter with the material in the cup interior and the cup plate rotationally moved relative to the lid to the cup fill prevented/release orientation, the measured volume of material in the cup interior area is enabled to be dispensed by gravity from the cup outlet.

8. The apparatus according to claim 7
wherein the latch includes
a projection,
a recess,
wherein the projection is in direct operative connection with one of the cup closure and the cup, and the recess is in direct operative connection with the other of the cup closure and the cup,
wherein engagement of the projection and the recess is operative to hold the cup closure in the cup closed position,
wherein relative movement of the lid and the cup plate to the cup fill prevented/release orientation is operative to cause disengagement of the projection and the recess, whereby the cup closure is enabled to move to the cup dispense position.

9. The apparatus according to claim 8
and further comprising:
a pushrod, wherein the pushrod is in operatively supported movable connection with the cup plate and is movable parallel to the axis,
a cam lobe, wherein the cam lobe is in fixed operative connection with the lid,
wherein relative rotational movement of the cup plate and the lid is operative to cause the pushrod and the cam lobe to selectively operatively engage and disengage,
wherein in the cup fill prevented/release orientation, at least one of the operative engagement and disengagement of the pushrod and the cam lobe is operative to cause relative movement of the projection and recess, wherein the projection and recess are caused by the latch to be disengaged and the cup closure is enabled to move to the cup dispense position.

10. The apparatus according to claim 9
wherein the cam lobe is in fixed operative connection with the ring portion of the lid, wherein the cam lobe extends parallel to the axis and outward from the ring portion.

11. The apparatus according to claim 10
wherein the pushrod includes a foot, wherein the foot extends at an end of the pushrod immediately adjacent the lid,
wherein the foot extends radially outward relative to the axis from the pushrod and is bounded by opposed substantially radially extending side surfaces,
wherein the cam lobe is operative to move the pushrod by engagement with the foot.

12. Apparatus comprising:
a measuring and dispensing device configured to selectively dispense a measured volume of flowable solid human consumable material from a container,
wherein the container includes a container interior configured to house the material, and an externally threaded container opening that extends through the container to the container interior, and through which container opening the material is enabled to flow out of the container interior responsive to gravity,
the device including:
a lid, wherein the lid includes
a ring portion, wherein the ring portion bounds a circular inner lid recess,
wherein the ring portion that bounds the circular inner lid recess includes internal threads, wherein the internal threads are configured to releasably matingly engage the externally threaded container opening,
a circular lid plate portion, wherein the lid plate portion
substantially closes the circular inner lid recess,
includes a circular substantially planar outer lid plate face,
wherein the outer lid plate face includes a lid plate opening, wherein the lid plate opening extends through the circular lid plate portion to the circular inner lid recess,
a cup plate,
wherein the cup plate includes,
a circular substantially planar inner cup plate face, wherein the cup plate is rotatably movably mounted in operative connection with the lid,
wherein the cup plate is rotatably movable about an axis and with the inner cup plate face in operatively abutting connection with the outer lid plate face,
a cup, wherein the cup includes an inner cup side and an opposed outer cup side, wherein the inner cup side is in operative fixed connection with the cup plate, and wherein the outer cup side includes a cup outlet, wherein the cup extends outwardly on an opposed side of the cup plate from the inner cup plate face,
wherein the cup bounds a cup interior, wherein the cup interior has an interior volume that corresponds to the measured volume,
wherein the cup plate includes a cup plate opening, wherein the cup plate opening extends through the cup plate from the inner cup plate face to the cup interior at the inner cup side,
  wherein the cup plate opening is disposed radially away from the axis,
wherein the cup plate and the lid are relatively rotationally movable between
  a cup fill enabled orientation, wherein in the cup fill enabled orientation the cup plate opening and the lid plate opening are in overlapping relation such that material is enabled to flow out from the container interior to the cup interior,
  a cup fill prevented/release orientation, wherein in the cup fill prevented/release orientation the cup plate opening is angularly disposed away from the lid plate opening such that no material is enabled to flow out from the container interior to the cup interior,
a cup closure, wherein the cup closure is movably mounted in operative connection with the cup,
  wherein the cup closure is movable between
    a cup closed position, wherein in the cup closed position the cup closure closes the cup outlet,
    a cup dispense position, wherein in the cup dispense position the cup closure is disposed from the cup outlet such that material in the cup interior is enabled to flow out of the cup through the cup outlet,
a latch, wherein the latch is in operative connection with the cup closure, the cup plate, and the lid,
  wherein the latch includes a projection and a recess, and wherein operative engagement of the projection and the recess is operative to hold the cup closure in the cup closed position,
  wherein the projection is in direct operative connection with one of the cup closure and the cup, and the recess is in direct operative connection with the other of the cup closure and the cup,
  wherein when the cup plate and lid are in the cup fill enabled orientation the projection and the recess are operatively engaged such that the latch is operative to cause the cup closure to be held in the cup closed position, and
  wherein relative movement of the lid and the cup plate to the cup fill prevented/release orientation is operative to cause disengagement of the projection and the recess such that the latch is operative to cause the cup closure to not be held in the cup closed position and the cup closure to be enabled to move from the cup closed position to the cup dispense position,
whereby with the lid and cup plate in the cup fill enabled orientation, the cup interior area is enabled to be filled by gravity with material from the container interior while the cup closure is held by the latch in the cup closed position, and
thereafter with the material in the cup interior and the cup plate and lid in the cup fill prevented/release orientation, the latch causes the cup closure to not be held in the cup closed position by the latch and enables the cup closure to move to the cup dispense position in which the measured volume of material in the cup interior area is enabled to be dispensed by gravity from the cup outlet.

13. The apparatus according to claim 12
wherein the projection is manually disengageable from the recess in the cup fill enabled orientation.

14. The apparatus according to claim 12
and further comprising:
  a pushrod, wherein the pushrod is in operatively supported movable connection with the cup plate and is movable parallel to the axis,
  a cam lobe, wherein the cam lobe is in fixed operative connection with the lid,
    wherein relative rotational movement of the cup plate and the lid is operative to cause the pushrod and the cam lobe to selectively operatively engage and disengage,
    wherein in the cup fill prevented/release orientation at least one of the operative engagement and disengagement of the pushrod and the cam lobe is operative to cause relative movement of the projection and recess,
    wherein the projection and recess are disengaged and the cup closure is enabled to move to the cup dispense position.

15. The apparatus according to claim 14
wherein the cam lobe is in fixed operative connection with the ring portion of the lid,
wherein the cam lobe extends parallel to the axis and outward from the ring portion.

16. The apparatus according to claim 15
wherein the pushrod includes a foot, wherein the foot is positioned at the end of the pushrod immediately adjacent the lid,
  wherein the foot extends radially outward relative to the axis from the pushrod and is bounded by opposed substantially radially extending side surfaces at least one of which side surfaces is tapered further outwardly with increased distance from the lid,
  wherein the cam lobe causes movement of the pushrod by engagement with the foot.

17. The apparatus according to claim 16
wherein the ring portion includes an annular axially centered rim, wherein the rim extends outward from both the ring portion and the circular lid plate portion parallel to the axis,
wherein the rim radially outwardly bounds an outer lid recess,
wherein the cup plate extends in and is rotatable relative to the lid within the outer lid recess,
  wherein the rim includes the cam lobe.

18. The apparatus according to claim 17
wherein the projection is in direct operative connection with the cup closure, wherein the cup includes a cup outer surface, wherein the cup outer surface externally bounds the cup,
  wherein the recess extends on the cup outer surface,
  wherein the cup closure is in hinged connection with the cup on a side of the cup outer surface opposed of the recess,
wherein operative engagement of the pushrod and the cam lobe is operative to cause the pushrod to move parallel to the axis in operative engagement with the projection to cause the projection to disengage from the recess.

19. The apparatus according to claim 18
wherein the projection extends radially inward relative to the axis and wherein the recess extends radially inward relative to the axis on the cup outer surface,
wherein movement of the pushrod responsive to operative engagement with the cam lobe is operative to cause the projection to move radially outward to disengage from the recess.

20. The apparatus according to claim 19
wherein the projection is in operative connection with a tapered actuating face,
  wherein the tapered actuating face extends further radially outward relative to the axis with increased proximity to the lid,
wherein the pushrod includes a tapered projection engaging face, wherein the tapered projection engaging face extends further radially outward relative to the axis with increased proximity to the lid,
wherein the tapered actuating face is movable radially outward to cause the projection to disengage from the recess while in moving engagement with the projection engaging face of the pushrod.

21. The apparatus according to claim 19
and further comprising:
a guide sleeve, wherein the guide sleeve is in operative connection with the cup outer surface,
  wherein the guide sleeve bounds a guide sleeve opening,
  wherein the guide sleeve opening extends parallel to the axis,
  wherein the pushrod is movable in guided relation within the guide sleeve opening.

22. The apparatus according to claim 21
and further comprising:
a spring,
wherein the spring is in operative connection with the pushrod,
  wherein the spring is operative to bias the pushrod toward engagement with the cam lobe.

23. The apparatus according to claim 22
wherein the pushrod includes an elongated internal cavity,
wherein the spring comprises an elongated compression spring,
  wherein the spring extends in the elongated cavity,
  wherein the spring has a proximal end immediately adjacent the cup closure and a distal end immediately adjacent the lid,
  wherein the guide sleeve includes an inward facing guide sleeve wall, wherein the inward facing guide sleeve wall includes an inward facing spring actuating projection extending in the sleeve opening,
  wherein the inward facing spring actuating projection is in operative connection with the proximal end of the spring in the cavity.

24. The apparatus according to claim 23
wherein the elongated compression spring comprises a coil spring, wherein the coil spring includes a coil extending around a central spring opening,
  wherein the spring actuating projection includes a sleeve positioning pin,
    wherein the sleeve positioning pin extends in the central spring opening at the proximal end of the spring.

25. The apparatus according to claim 23
wherein the elongated compression spring comprises a coil spring, wherein the coil spring includes a coil extending around a central spring opening,
wherein the pushrod includes a pushrod positioning pin,
wherein the pushrod positioning pin extends in the central spring opening at the distal end of the spring.

26. The apparatus according to claim 23
wherein the elongated compression spring comprises a coil spring, wherein the coil spring includes a coil extending around a central spring opening,
wherein at least one of the guide sleeve and the pushrod includes a positioning pin, wherein the positioning pin extends in the central spring opening.

27. The apparatus according to claim 26
wherein with the lid stationary, the cup fill enabled orientation of the cup plate is disposed 180° from the cup fill prevented/release orientation of the cup plate.

28. The apparatus according to claim 26
wherein the projection is manually disengageable from the recess in the cup fill enabled orientation.

29. The apparatus according to claim 26 and further comprising:
a cup insert,
wherein the cup insert is releasably engaged in the cup interior,
wherein the measured volume of material dispensed is changeable with engagement and disengagement of the cup insert in the cup interior.

30. The apparatus according to claim 29
wherein the cup insert comprises an annular sleeve.

31. The apparatus according to claim 29
wherein the inner cup plate face includes a continuous axially centered annular cup plate projection, wherein the cup plate projection extends radially outward of the cup plate opening and toward the outer lid plate face,
wherein the outer lid plate face includes a continuous axially centered annular lid plate recess, wherein lid plate recess extends radially outward of the lid plate opening,
wherein the cup plate projection extends in the lid plate recess and is relatively movable in the lid plate recess with relative rotational movement of the cup plate and the lid.

32. The apparatus according to claim 12 and further comprising:
a cup insert,
wherein the cup insert is releasably engaged in the cup interior,
wherein the measured volume of material dispensed is changeable with engagement and disengagement of the cup insert in the cup interior.

33. The apparatus according to claim 12
wherein the inner cup plate face includes a continuous axially centered annular cup plate projection, wherein the cup plate projection extends radially outward of the cup plate opening and toward the outer lid plate face,
wherein the outer lid plate face includes a continuous axially centered annular lid plate recess, wherein lid plate recess extends radially outward of the lid plate opening,
wherein the cup plate projection extends in the lid plate recess and is relatively movable in the lid plate recess with relative rotational movement of the cup plate and the lid.

34. Apparatus comprising:
a measuring and dispensing device configured to selectively dispense a measured volume of flowable solid human consumable material from a container housing such material, wherein the container has an opening through which the material is enabled to flow out of a container interior responsive to gravity, the device including:

a lid,
- wherein the lid is configured to close the container opening,
- wherein the lid includes a circular lid plate that extends in centered relation about an axis, wherein the lid plate includes a lid plate opening therethrough that is radially disposed away from the axis, a cup plate,
- wherein the cup plate is rotationally movably mounted in operative connection with the lid and is rotationally movable about the axis,
- wherein the cup plate includes
  - a cup plate opening therethrough,
  - a cup, wherein the cup includes an inner cup side and an opposed outer cup side, wherein the inner cup side extends in surrounding relation of the cup plate opening and the outer cup side includes a cup outlet,
    - wherein the cup bounds a measured volume between the inner cup side and the outer cup side,
  - a cup closure, wherein the cup closure is movably mounted in operative connection with the cup,
  - wherein the cup closure is movable between
    - the cup closed position wherein the cup closure closes the cup outlet, and
    - a cup dispense position wherein the cup closure is disposed from the cup outlet such that material in the measured volume is enabled to flow out of the cup through the cup outlet,
- a latch, wherein the latch is operative to hold the cup closure in the cup closed position, wherein the latch is operative to
  - enable the cup closure to be movable manually between the cup closed position and the cup open position, and
  - automatically cause the cup closure to be changed from the cup closed position to the cup open position responsive to the cup plate being in a release rotational position relative to the lid, wherein with the closure member in the cup closed position and the cup plate rotationally oriented relative to the lid in a cup fill position in which the cup plate opening and the lid plate opening are in overlapping relation, material from the container interior area is enabled to fill the measured volume within the cup, and wherein thereafter with the cup plate rotationally moved relative to the lid away from the cup fill position such that the cup plate opening and the lid plate opening are no longer in overlapping relation, material within the measured volume is held between the lid plate and the cup closure, and thereafter responsive to the cup plate being rotationally moved relative to the lid to the release position, the cup closure is automatically released responsive to the latch and the measured volume of material is dischargeable from the cup through the cup outlet.

* * * * *